United States Patent [19]

Nishio

[11] Patent Number: 5,506,714
[45] Date of Patent: Apr. 9, 1996

[54] OPTICAL ATM SELF-ROUTING SWITCHING SYSTEM WITH REDUCED ROUTING HEADER BITS

[75] Inventor: Makoto Nishio, Tokyo, Japan

[73] Assignee: NEC Corporation, Tokyo, Japan

[21] Appl. No.: 364,496

[22] Filed: Dec. 27, 1994

Related U.S. Application Data

[62] Division of Ser. No. 983,232, Nov. 30, 1992, Pat. No. 5,432,627.

[30] Foreign Application Priority Data

Nov. 29, 1991 [JP] Japan .................................. 3-315873
Sep. 25, 1992 [JP] Japan .................................. 4-280986

[51] Int. Cl.$^6$ .................................................. H04J 14/08
[52] U.S. Cl. ........................ 359/139; 359/117; 370/60.1; 370/68.1
[58] Field of Search ..................... 370/60, 60.1, 68.1, 370/94.1; 359/117, 139

[56] References Cited

U.S. PATENT DOCUMENTS

| | | | |
|---|---|---|---|
| 5,166,926 | 11/1992 | Cisneros | 370/60 |
| 5,202,885 | 4/1993 | Schrodi | 370/60 |
| 5,229,991 | 7/1993 | Turner | 370/94.1 |

*Primary Examiner*—Leslie Pascal
*Attorney, Agent, or Firm*—Sughrue, Mion, Zinn, Macpeak & Seas

[57] ABSTRACT

In an optical ATM switching system, an optical ATM cell is produced in response to an incoming ATM cell so that it contains an optical routing bit in a timeslot corresponding to the destination of the cell. A first switching stage is provided for routing the cell from one of its inlets to one of its outlets in accordance with the routing bit contained in the cell and generating a routing signal indicative of the position of the outlet to which the cell is routed. A second switching stage is connected to the outlets of the first switching stage for routing the cell to one of optical buffers in response to the routing signal from the first switching stage. Optical combiners are provided, each corresponding to a group of the optical buffers for combining outputs of the corresponding group of optical combiners.

2 Claims, 19 Drawing Sheets

Sorter

FIG. 17
Priority Gate
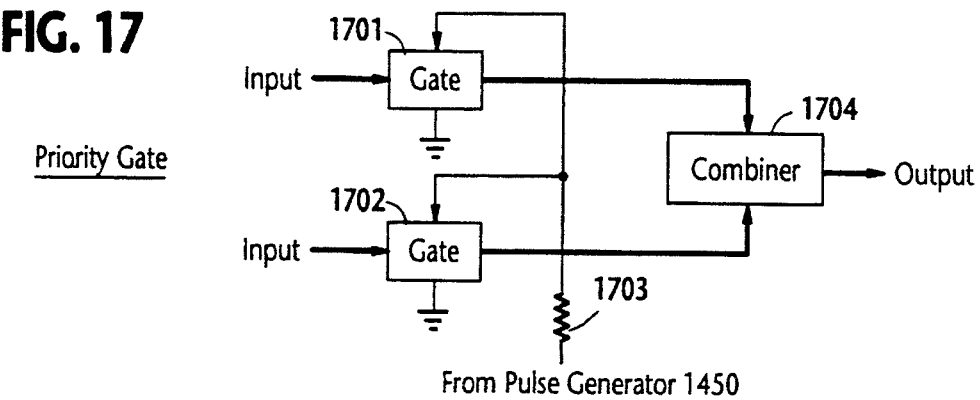
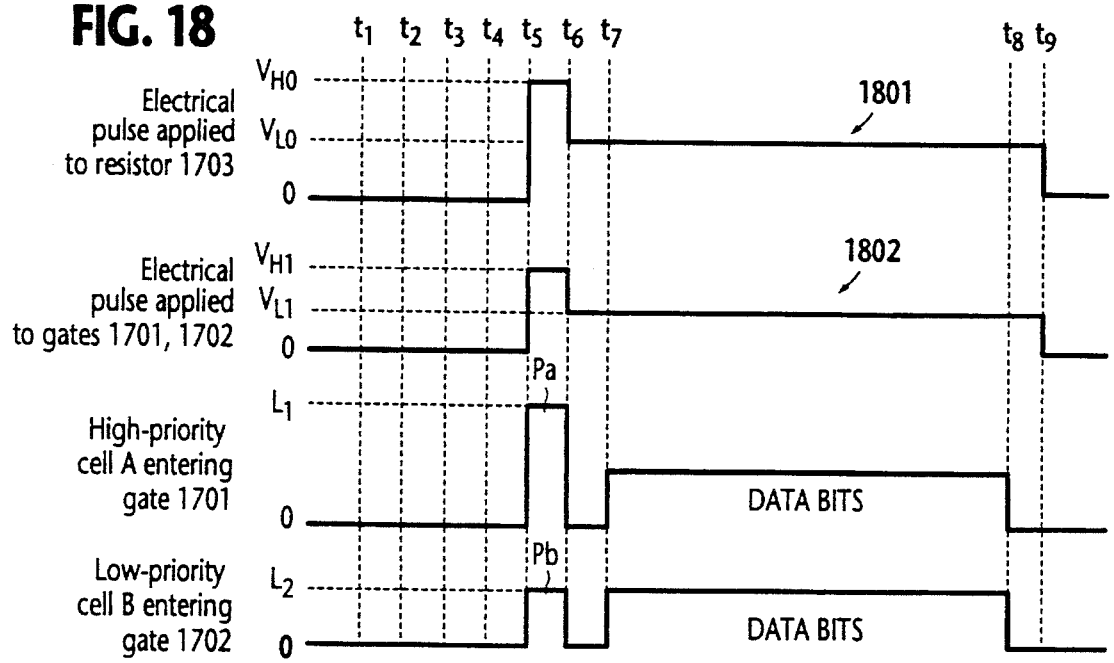
FIG. 18
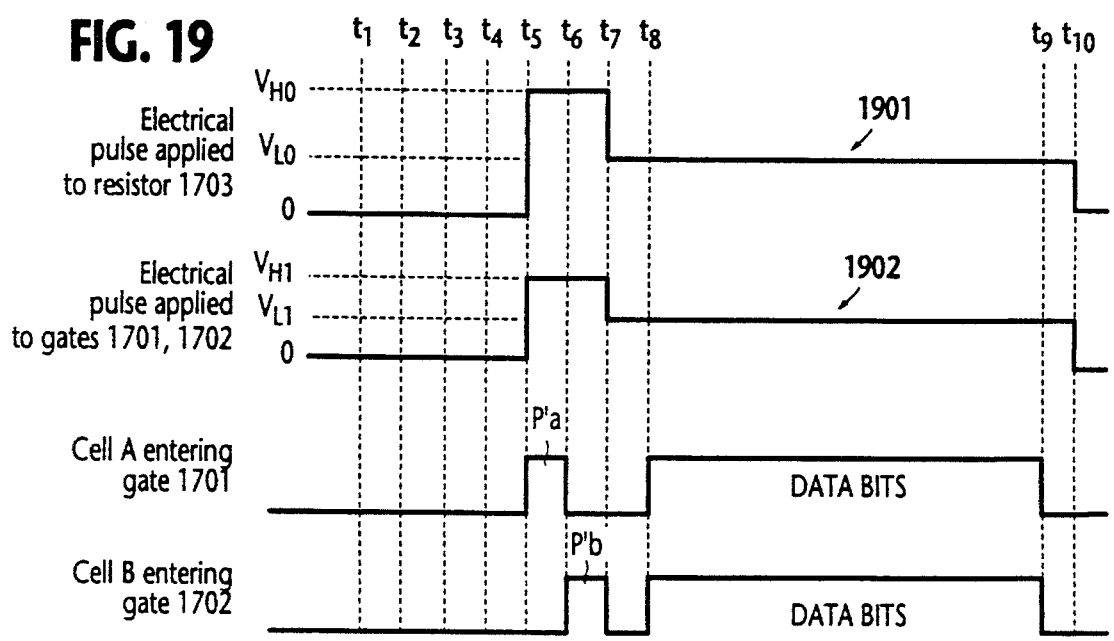
FIG. 19

OPTICAL ATM SELF-ROUTING SWITCHING SYSTEM WITH REDUCED ROUTING HEADER BITS

This is a divisional of application Ser. No. 07/983,232 filed Nov. 30, 1992 now U.S. Pat. No. 5,432,627.

RELATED APPLICATION

This application is related to Co-pending U.S. patent application Ser. No. 07/792,191, filed Nov. 14, 1991, titled "Self-Routing Network Using Optical Gate Array Driven By control Voltages Coincidental With Packet Header Pulses", Shuji Suzuki et al, and assigned to the same assignee as the present invention.

BACKGROUND OF THE INVENTION

1. Field of the Invention

The present invention relates generally to optical switching systems, and more specifically to an optical asynchronous transfer mode (ATM) switching system for broadband ISDN (Integrated Services Digital Network).

2. Description of the Related Art

A photonic packet switching system having input buffers is described in a paper "Photonic Packet Switch Based On VSTEP Two-Dimensional Array", S. Suzuki et al., Photonic Switching, 1991 Technical Digest Series Mach 6–8, 1991, Salt Lake City, Utah, Cosponsored by Optical Society of America, IEEE/Lasers and Electro-Optics Society. The input buffers are followed by an optical self-routing network for routing a packet, or ATM cell launched into the network from the buffers through an array of voltage-controlled optical gates to one of the outlets of the network depending on whether an electrical gating signal timely coincides with a header bit of the cell.

If an optical (N×N) self-routing network is implemented using the coincidental routing technique, $N^2$ header bits would be required for routing ATM cells to any of the outlets of the network without collision with the other cells at the outlets due to the need to identify all positions of the outlets as well as the need to identify the inlets. This number would prohibitively increase as the number of inlets and outlets increases since the header bits degrade the throughput of the system. If priority control is implemented, an extra amount of timeslots would be required. Additionally, the known photonic switching system is not capable of meeting a desire that copies of a cell be routed simultaneously to several destinations.

SUMMARY OF THE INVENTION

It is therefore an object of the present invention to reduce the optical header bits of an optical ATM switching system to improve the throughput thereof.

Another object of this invention is to provide an optical ATM switching system which allows priority control to be performed on ATM cells.

A further object of the present invention is to provide an ATM switching system capable of routing copies of ATM cells to multiple destinations.

According to a first aspect of the present invention, there is provided an optical ATM switching system which comprises a plurality of interface means responsive to an incoming ATM cell for producing an optical ATM cell containing a routing bit located in a timeslot corresponding to the destination of the ATM cell. The system includes a first switching stage having a plurality of inlets connected to the interface means for receiving the optical ATM cell at one of the inlets and routing the cell to one of the outlets of the switching stage in accordance with the routing bit and generating a routing signal indicative of the position of the outlet to which the cell is routed. A second switching stage is connected to the outlets of the first switching stage for routing the optical ATM cell therefrom to one of optical buffers in response to the routing signal from the first switching stage. A plurality of optical combiners are provided corresponding to a group of the optical buffers for combining outputs of the corresponding group of optical combiners.

According to a second aspect of this invention, the optical ATM switching system comprises a plurality of priority sorters connected to the outputs of the second switching stage, each of the priority sorter means corresponding to a group of the optical buffers for sorting optical ATM cells incident thereon to one of the optical buffers of the corresponding group according to priorities of the sorted cells. The optical combiners are formed into groups, and connected to the optical buffers such that each combiner of each group receives ATM cells of higher priority and every other optical combiner of the group receives ATM cells of lower priority. A plurality of priority gates are provided corresponding respectively to the groups of the optical combiners. Each priority gate is connected to the optical combiners of the corresponding group for allowing passage of one of incident ATM cells having higher priority when contention occurs with incident ATM cells having lower priority.

According to a third aspect of this invention, the optical ATM switching system comprises a multicasting controller for generating a multicast control signal indicating destinations of copies of an optical ATM cell. A plurality of second interface means are provided for inserting optical copying bits into an optical ATM cell in response to the multicast control signal. An optical copy network is provided having a plurality of inlets connected respectively to the second interface means for producing copies of an ATM cell from each of the second interface means and routing the copies to a plurality of outlets of the copy network according to said copying bits.

BRIEF DESCRIPTION OF THE DRAWINGS

The present invention will be described in further detail with reference to the accompanying drawings, in which:

FIG. 17 is a block diagram of a priority gate of FIG. 13;

FIG. 18 is a timing diagram associated with the priority gate of FIG. 17;

FIG. 19 is a timing diagram associated with the priority gate of FIG. 17 using modified voltage and priority pulse waveforms;

DETAILED DESCRIPTION

Figure 1:
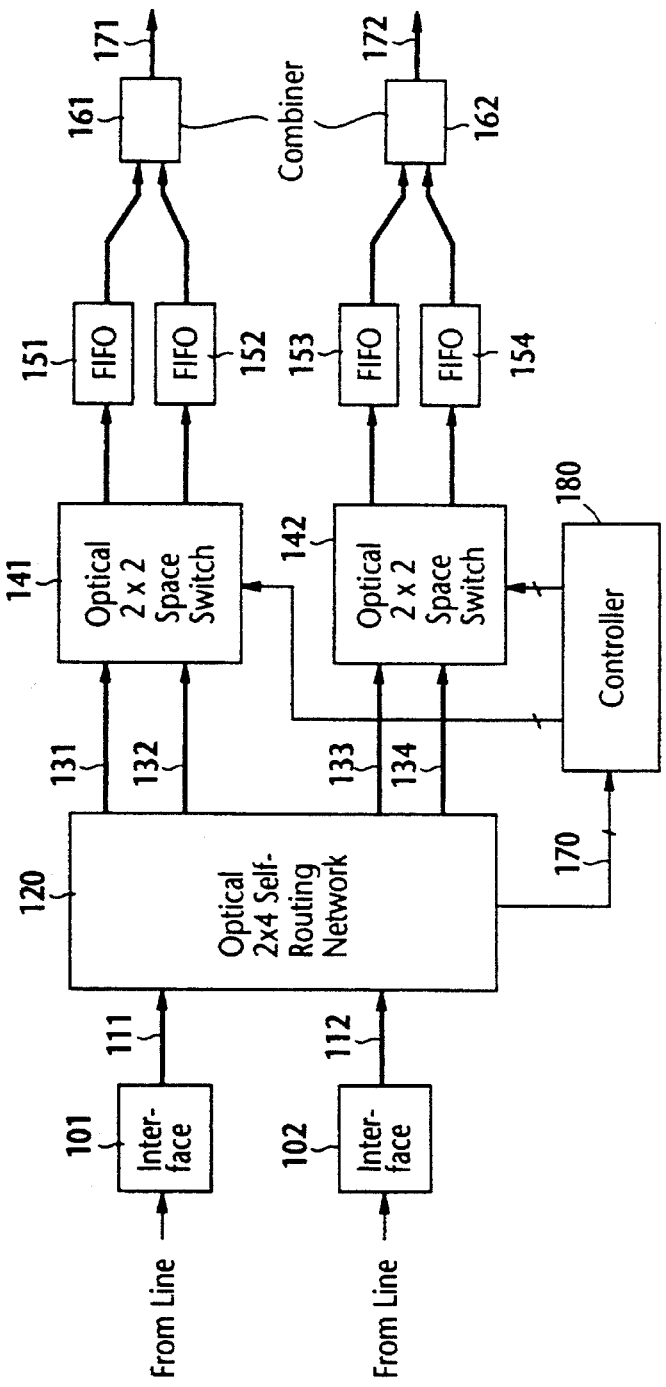
FIG. 1 is a block diagram of an optical (2×2) ATM switching system according to a first embodiment of the present invention.
Figure 1A:
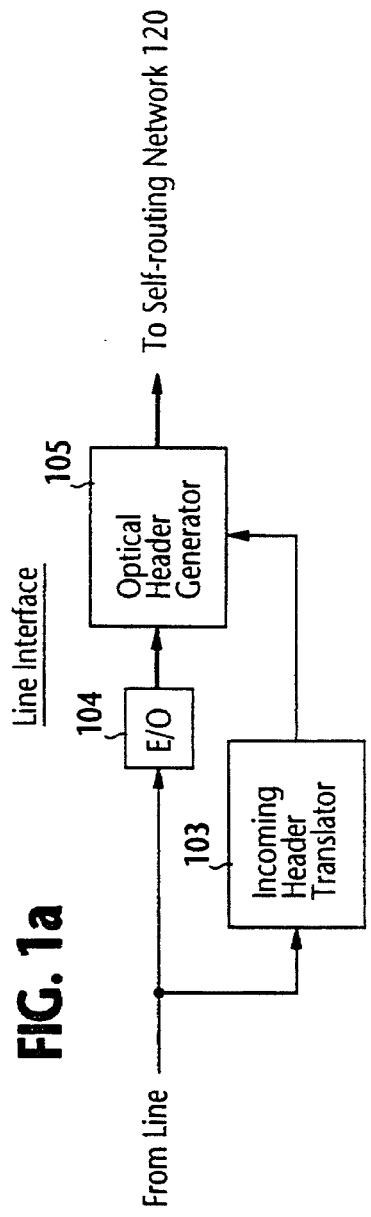
FIG. 1a is a block diagram of a line interface unit of FIG. 1.

In the following description, the first one or two digits of an element's reference number designates the figure where the element is located. Referring first to FIG. 1, there is shown an optical (2×2) ATM (asynchronous transfer mode) switching system according to a first embodiment of the present invention. Incoming electrical packets, or ATM cells of 53-byte length are input to line interface units 101 and 102 of the switching system where their cell headers are analyzed by an incoming header translator 103 (FIG. 1a) and converted optical signals by an electrooptical converter 104 and applied to an optical header generator 105. The optical switching system of this invention defines an optical header preceding each ATM cell. The optical header is equally separated into timeslots which are synchronized with system timing and uniquely assigned to different destinations. The header translator 103 is synchronized with the system timing to produce an output signal indicating the position of a timeslot into which an optical header bit is to be generated for routing purposes in accordance with the analysis of a destination code contained in the received ATM cell. The timeslot indicating signal is output to the optical header generator 105 to allow insertion of an optical header bit into the indicated position of an optical header that precedes the optical ATM cell from the E/O converter 104. The output signal from the header generator 105 of each interface unit is therefore a series of an optical header and an optical 53-byte ATM cell, and is delivered as an output of the interface unit. The outputs of interface units 101 and 102 are respectively coupled via light waveguides 111 and 112 to respective inlets of an optical (2×4) self-routing network 120 in which they are switched, or transferred to one of its outlets which are coupled to waveguides 131–134. Waveguides 131, 132 are connected to respective inlets of a conventional optical (2×2) space switch 141, and waveguides 133, 134 are coupled to respective inlets of an optical (2×2) space switch 142.

Each of these (2×2) space switches is controlled in response to a switching supplied from a controller 180 to alternately (sequentially) select one of its outlets to establish a switched path between the inlet to which the optical signal from the preceding stage appears and the selected outlet. As will be described, controller 180 receives a routing signal via a signal bus 170 from the self-routing network 120 to generate the switching signal for coupling to the space switches 141, 142.

The outlets of the space switch 141 are connected to optical first-in-first-out (FIFO) buffer memories 151, 152 whose outputs are combined by an optical combiner 161 onto an output waveguide 171. Likewise, the outlets of the space switch 142 are connected to optical FIFO buffer memories 153, 154 whose outputs are combined by an optical combiner 162 onto an output waveguide 172. In this way, cells are queued in the respective buffer memories 151–154 to avoid possible output contention with other cells bound for the same destination.

Figure 2:
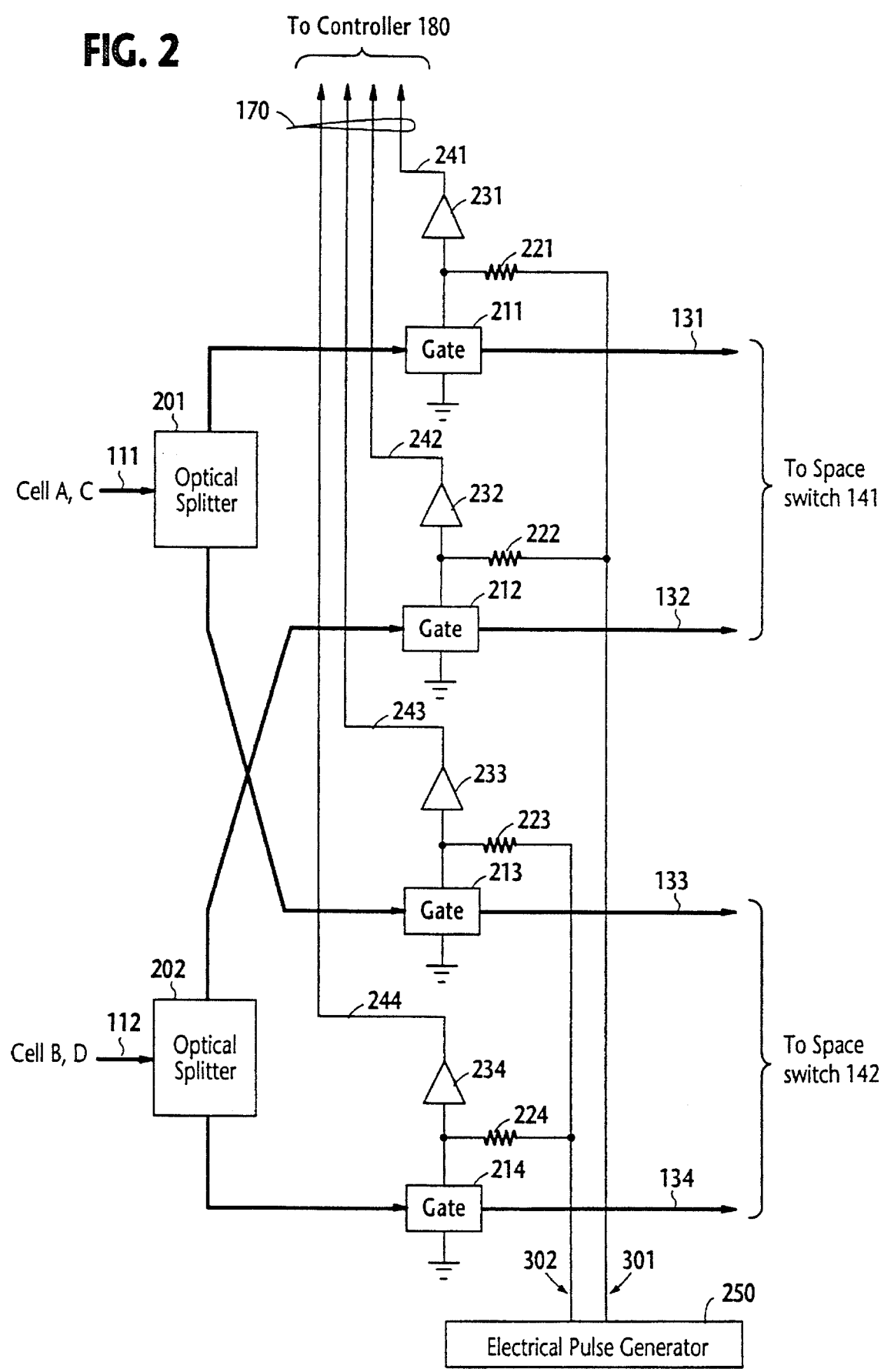
FIG. 2 is a block diagram of the (2×4) self-routing network of FIG. 1.

As shown in FIG. 2, the (2×4) self-routing network 120 comprises optical splitters 201 and 202 to which the waveguides 111 and 112 are respectively terminated. The optical ATM cell supplied through the waveguide 111 are split by splitter 201 into two identical signals which are led to optical gates 211 and 213 whose output terminals are connected via waveguides 131, 132 to the respective inlets of the (2×2) space switch 141. In like manner, the optical cell on supplied through the waveguide 112 is split by splitter 202 into identical signals which are led to optical gates 212 and 214 whose outputs are connected to waveguides 134 and 135, respectively. An electrical pulse generator 250 is provided for applying a first voltage control pulse 301 (see FIG. 3) to the control electrode of optical gates 211 and 212 via resistors 221 and 222, respectively, and a second voltage control pulse 302 to optical gates 213 and 214 via resistors 223 and 224, respectively. Voltage sensors 231–234 are connected respectively to the control electrodes of optical gates 211 to 214. As described below, a significant voltage drop occurs at the control terminal of each optical gate as a result of a current passing through the associated resistor when the header bit of an incident optical signal is time-coincident with an initial high voltage portion or header of a voltage pulse applied to the gate. The voltage drop developed at each of these optical gates is detected by the associated voltage sensor. On detecting a voltage drop, voltage sensors 231–234 produce respective output signals on control signal lines 241 to 244 which are bundled to form the signal bus 170 to the controller 180.

Figure 3:
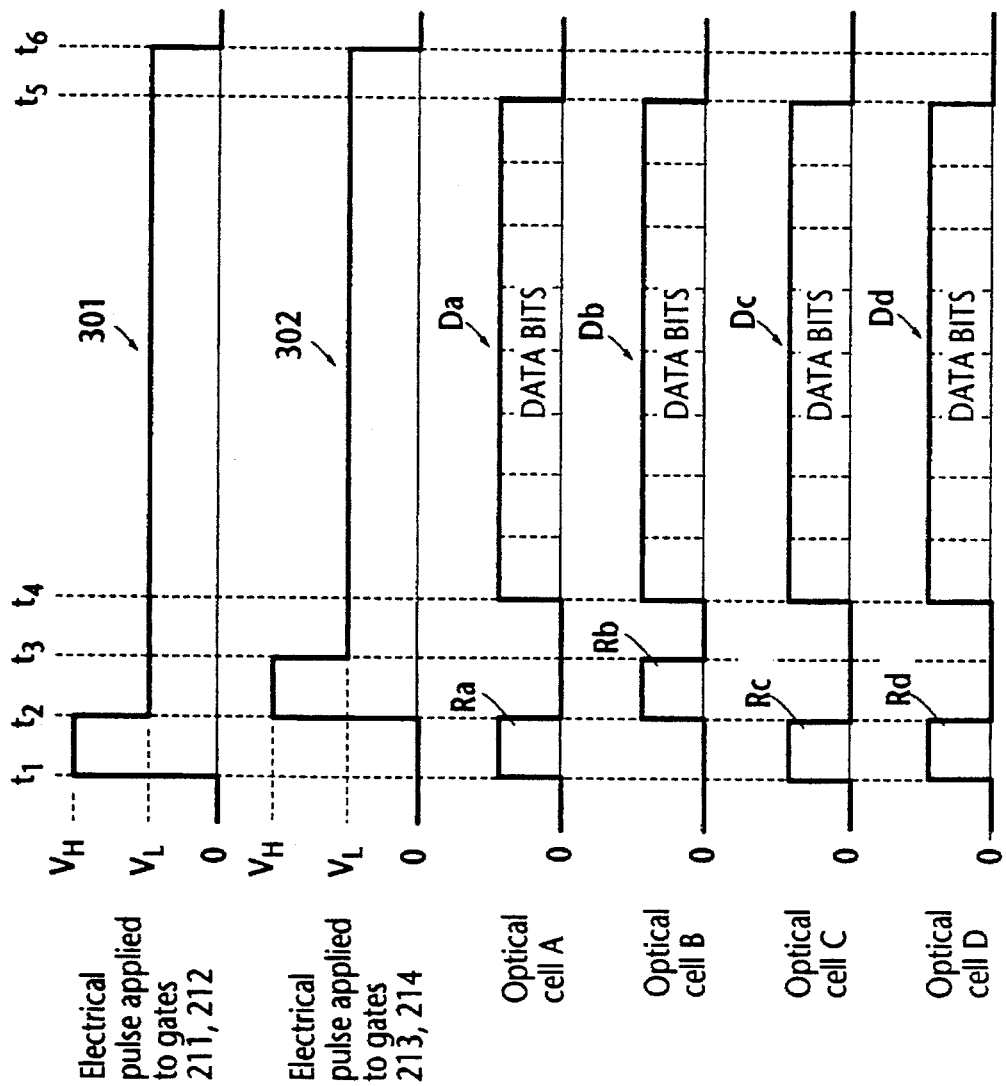
FIG. 3 is a timing diagram associated with FIG. 2.

As illustrated in FIG. 3, the header of each voltage pulse applied to the associated optical gate triggers it into a light transmissive state by consuming the light energy of the routing header bit of an incident optical signal and the pedestal portion of the voltage pulse that follows maintains the gate under the transmissive state to allow the data portion of the optical signal to pass through it. Therefore, on leaving the optical gate, each optical signal loses its routing header bit and only the data portion of ATM cell appears at the output of the gate.

More specifically, voltage pulse 301 rises from zero amplitude to a highest amplitude $V_H$ at time $t_1$ and drops to a lower level, or pedestal $V_L$ at time $t_2$ and drops to zero at time $t_6$, while voltage pulse 302 rises from zero amplitude to the highest amplitude $V_H$ at time $t_2$ and drops to the pedestal $V_L$ at time $t_3$ and drops to zero at time $t_6$. Each ATM cell has a routing header bit that exists during a time slot between $t_1$ and $t_3$, followed by a series of 53-byte data bits that exist between $t_4$ and $t_5$. It is assumed that that cells A and C are originated from a same or different sources during first and second intervals, respectively, and multiplexed onto the waveguide 111, and cells B and D are likewise originated during the first and second intervals, respectively, and multiplexed onto the waveguide 112. For the purpose of illustration, assume that the routing header bits $R_a$, $R_c$ and $R_d$ of ATM cells A, C and D occur during the same timeslot $t_1$–$t_2$ of the header interval $t_1$–$t_3$ and the routing header bit Rb of cell B occurs during timeslot $t_2$–$t_3$.

Since the header bit Ra is time-coincident with the header of voltage pulse 301 applied to gates 211 and 212, the data portion Da of cell A is passed through gate 211 to waveguide 131, and the header bit Rb is time-coincident with the header of voltage pulse 302 applied to gates 213, 214, the data portion Db of cell B is passed through gate 214 to waveguide 134. In like manner, the header bits Rc and Rd are respectively time-coincident with the header of voltage pulse 301. Thus, the data portions Dc and Dd of cells C and D are passed through gates 211 and 212 respectively to waveguides 131 and 132. Therefore, depending on the timeslot position of their header bits, the optical cells incident on splitter 201 are routed to waveguide 131 or 133, and the optical cells incident on splitter 202 are routed to waveguide 132 or 134.

When cell A is passed through gate 211, the voltage sensor 231 produces an output that is coupled through control line 241 to the controller 180 as a routing signal indicating that a cell is routed to the upper inlet of space switch 141. Likewise, when cell D is passed through gate 212, the voltage sensor 232 produces an output that is coupled through control line 242 to the controller 180 to indicate that a cell is routed to the lower inlet of space switch 141. Thus, the routing signals at control lines 243 and 244 indicate that cells are routed to the upper and lower inlets of switch 142, respectively. The controller 180 uses the routing signal as an indication of the location of a cell at one of the inlets of the space switches 141 and 142 to supply a switching signal to one of the switches 141 and 142 which is indicated by the routing signal to cause to establish a path between the inlet identified by the routing signal and one of the outlets of the (2×2) space switch and the cell is queued in the FIFO buffer memory coupled to that space switch.

With the output queuing (buffer) principle of the present invention, the (2×2) ATM switching system of the first embodiment of this invention requires only two time slots. This represents a reduction of the number of optical header timeslots required for self-routing purposes in comparison with four timeslots required with the prior art (2×2) input buffer ATM switching system, and hence, the throughput of an optical (2×2) ATM switching system is increased by a factor of 2. With N×N output buffer switching systems of this invention, a reduction of header timeslots by a factor of N is achieved.

The same timeslot reduction effect is equally achieved by the embodiments which will be described below.

Figure 4:
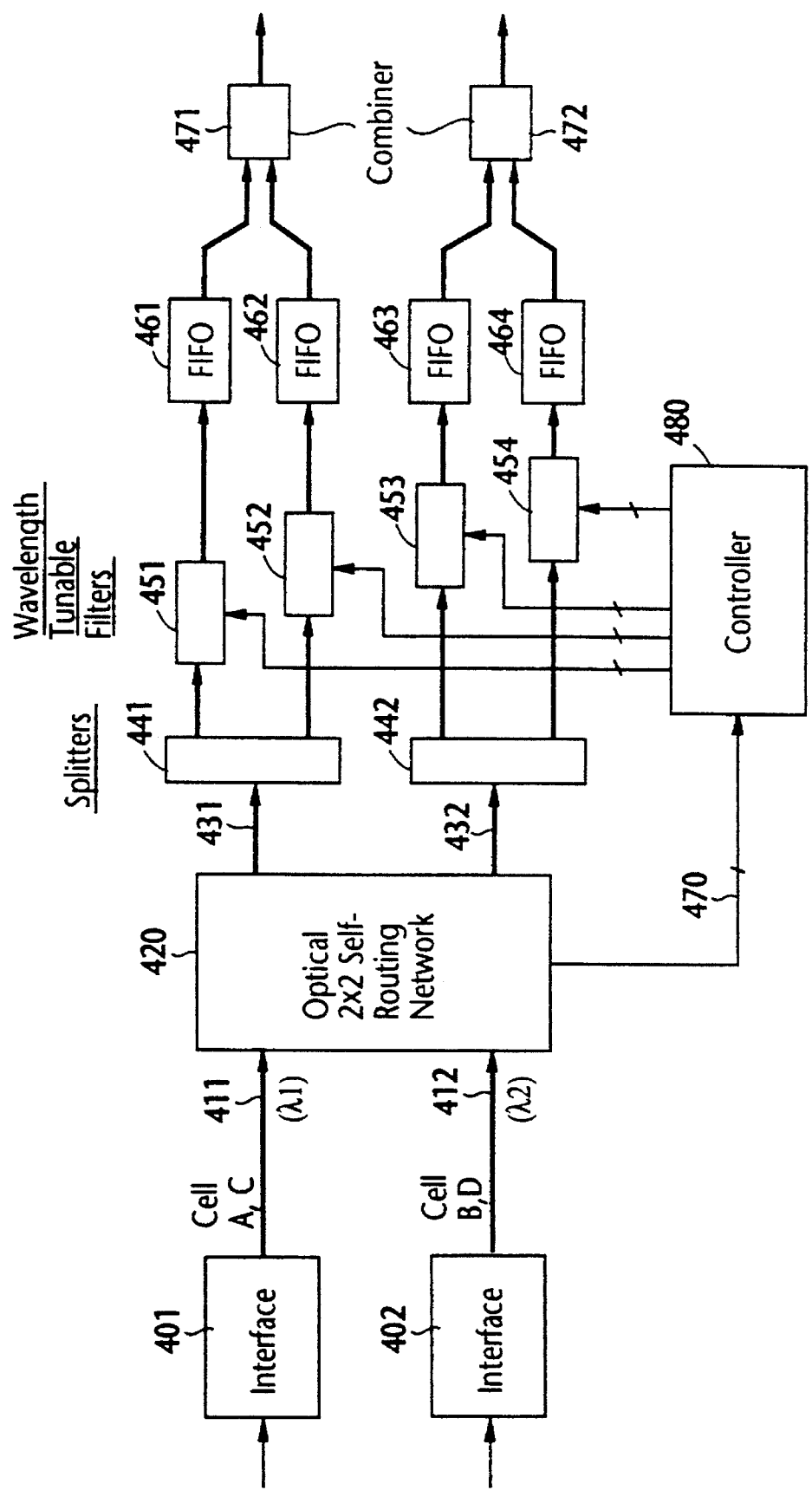
FIG. 4 is a block diagram of an optical (2×2) ATM switching system according to a second embodiment of the present invention.

In the second embodiment of this invention, shown in FIG. 4, optical ATM cells are carried on different wavelengths when the corresponding electrical cells are processed by the respective interface units 401 and 402, and the routing network 120 and (2×2) switches 141, 142 of the previous embodiment are replaced with an optical (2×2) self-routing network 420, splitters 441, 442 coupled by waveguides 431 and 432 to the outlets of network 420, and wavelength tunable filters 451 to 454 coupled to the outputs of splitters 441, 442. The wavelength of optical ATM cells A and C is designated λ1 and the wavelength of the other cells is designated λ2.

Figure 5:
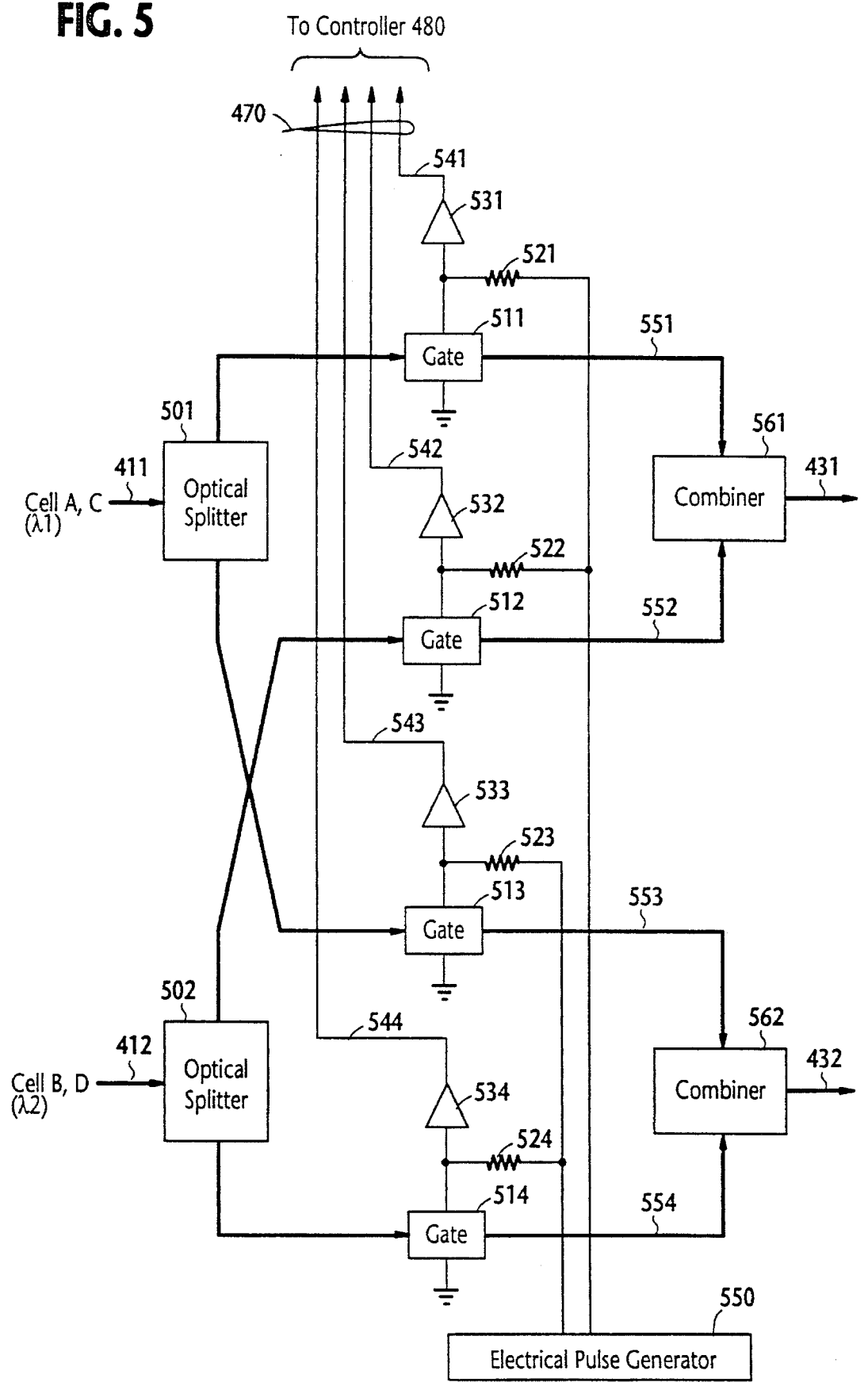
FIG. 5 is a block diagram of the (2×2) self-routing network of FIG. 4.

As shown in FIG. 5, the (2×2) self-routing network 420 differs from the routing network 120 of the first embodiment by the inclusion of an optical combiner 561 for combining cells from optical gates 511 and 512 for coupling to waveguide 431 and an optical combiner 562 for combining cells from gates 513, 514 for coupling to waveguide 432. If the incoming cells occur in the same time intervals as in FIG. 2 with the same optical header timeslot positions coinciding with the same voltage control pulses as those in FIG. 2 as illustrated in FIG. 3, cells A and C appear at waveguide 551, cell D appears at waveguide 552 and cell B appears at waveguide 535 in the same way as in FIG. 2. Cells A and C are therefore time multiplexed onto waveguide 431, and cells C and D are wavelength multiplexed by combiner 561 onto waveguide 431 and applied to the splitter 441. On the other hand, cell B is applied to the splitter 442 without being multiplexed in any form with other cells.

Returning to FIG. 4, each of the cells A, C and D, on entering splitter 441, is split into replicas of the cell, which are applied respectively to the wavelength tunable filters 451 and 452, while cell B is split by splitter 442 into identical signals for coupling to the wavelength tunable filters 453 and 454, respectively. Controller 480 produces a wavelength tuning signal that enables each wavelength tunable filter to selectively pass one of wavelengths λ1 and λ2 and applies it to one of the wavelength tunable filters. The generation of the tuning signal and the application of this signal are determined in accordance with a routing signal supplied via signal bus 470 from the (2×2) self-routing network 420. The outputs of wavelength tunable filters 451 and 452 are supplied to FIFO buffer memories 461 and 462, respectively, whose outputs are combined by combiner 471, while the outputs of wavelength tunable filters 453, 454 are supplied to FIFO buffer memories 463, 464, respectively, whose outputs are combined by combiner 472. For example, by tuning the filters 451 and 452 to wavelengths λ1 and λ2, respectively, cells A and C are sequentially stored into memory 461 and cell D is stored in memory 462.

Figure 6:
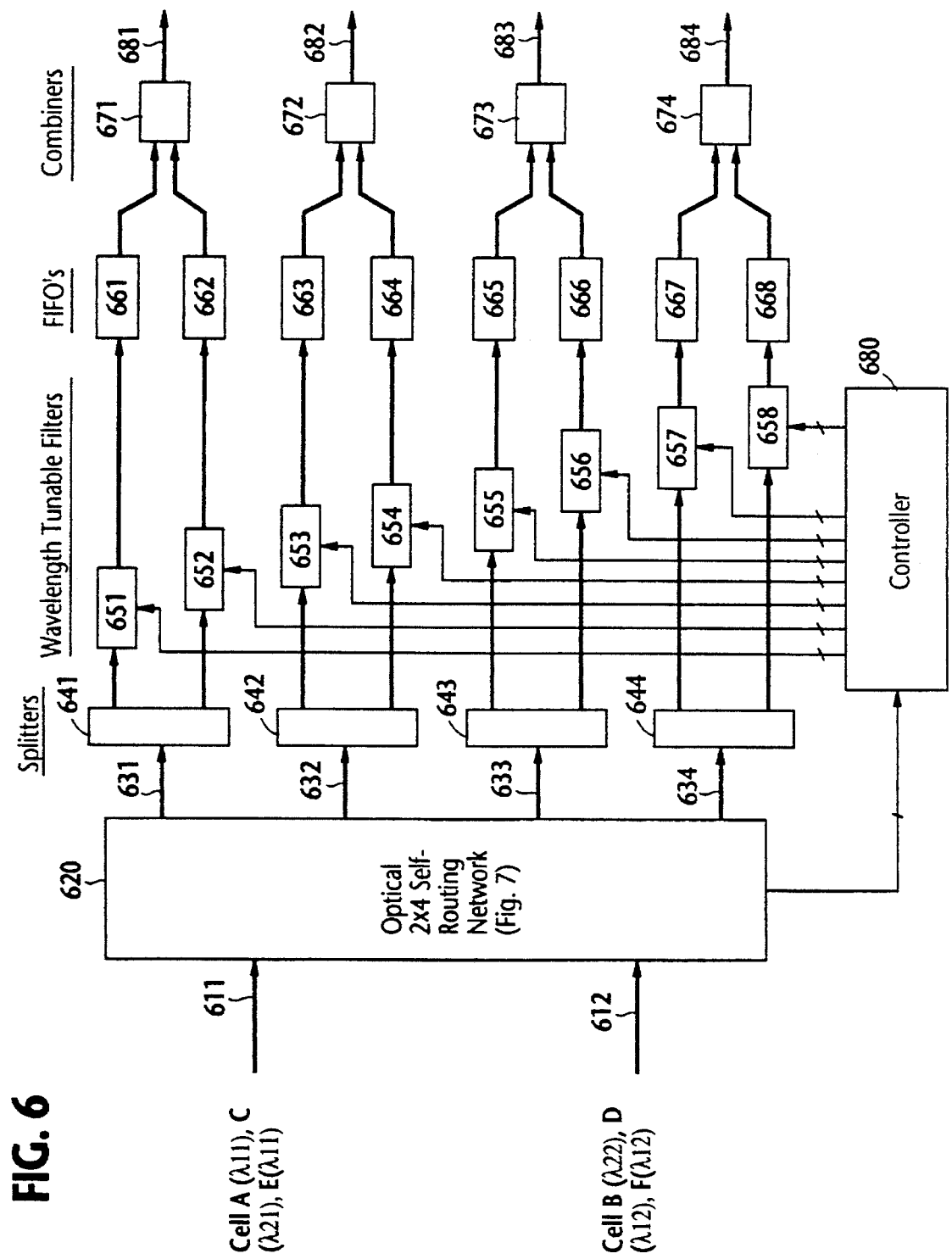
FIG. 6 is a block diagram of an optical (2×4) ATM switching system according to a third embodiment of the present invention.

FIG. 6 is a block diagram of a third embodiment of the present invention in which an optical (2×4) ATM switching system is illustrated. This embodiment utilizes wavelength multiplexing to reduce the number of the timeslots for the optical routing header bit of the (N×M) ATM switching system to 1/g of the number which would otherwise be required for an optical (N×M) ATM switching system of input buffer type.

In FIG. 6, the (2×4) switching system includes an optical (2×4) self-routing network 620 which sequentially receives incoming cells A, C and E of different wavelengths through waveguide 611 and cells B, D and F of different wavelengths through waveguide 612. The outlets of self-routing network 620 are coupled respectively through waveguides 631–634 to optical splitters 641–644 each of which splits the input signal into two identical signals for coupling to a corresponding one of wavelength tunable filters 651–658 whose outputs are coupled respectively to optical FIFO buffer memories 661–668. The memories 661–668 are formed into four pairs corresponding respectively to combiners 671–674 and the outputs of the memories of each pair are combined by the corresponding to combiner to appear at one of output waveguides 681–684. Controller 680 is responsive to a routing signal from the network 620 for generating a wavelength tuning signal and applying it to one of the wavelength tunable filters 651–658 in a manner similar to the second embodiment.

Figure 7:
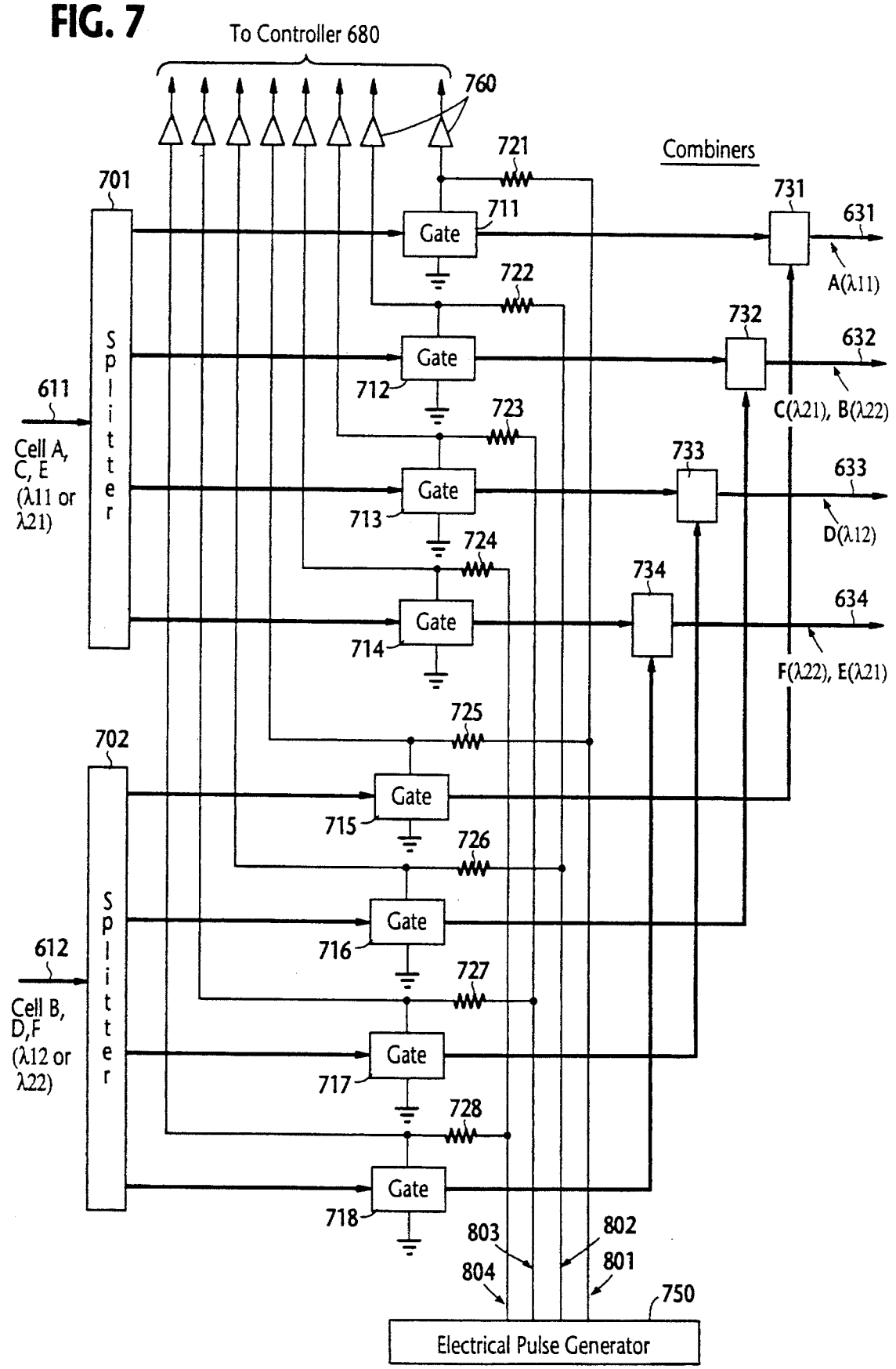
FIG. 7 is a block diagram of the (2×4) self-routing network of FIG. 6.
Figure 8:
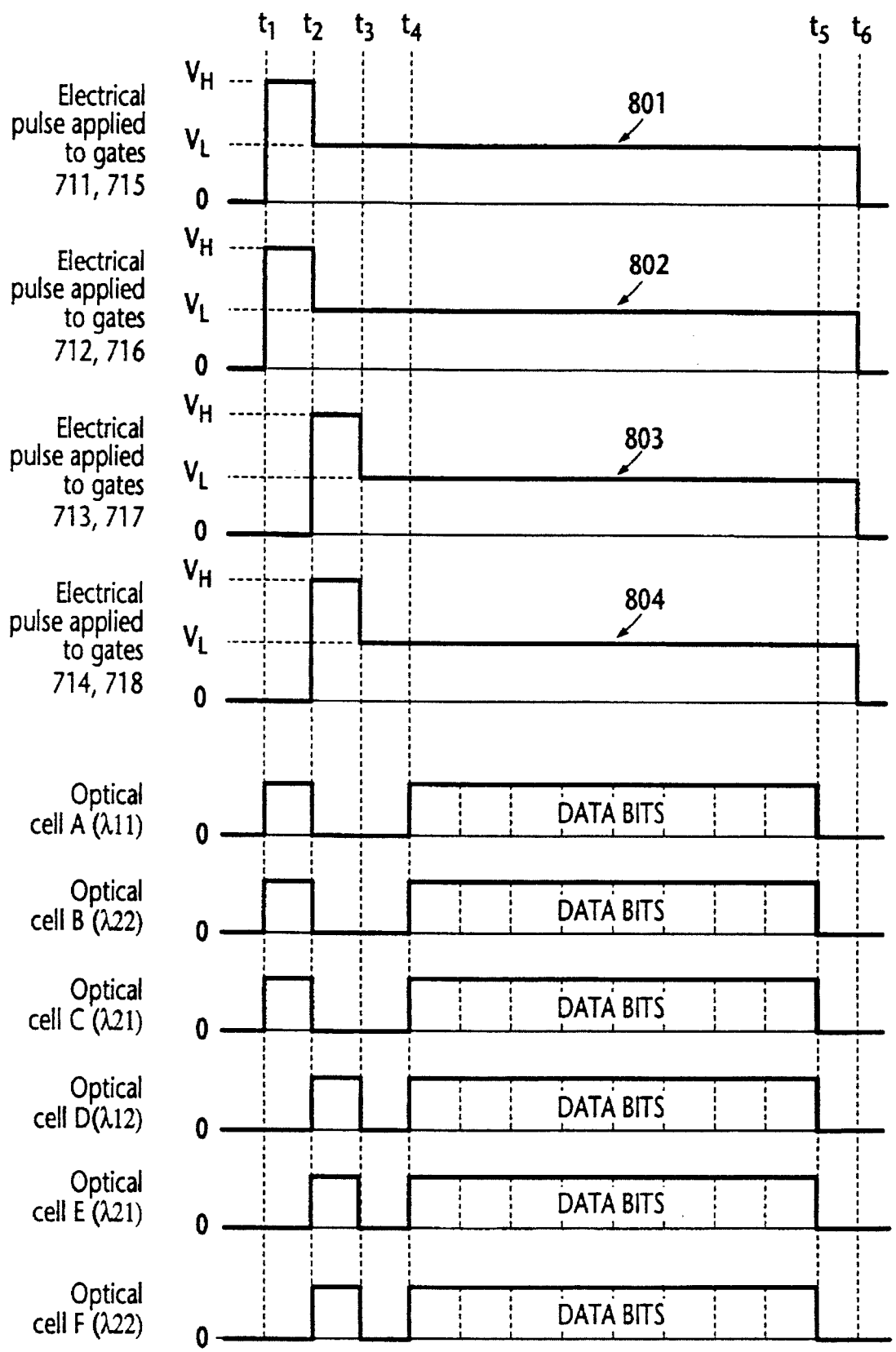
FIG. 8 is a timing diagram associated with FIG. 7.

In FIG. 7, the optical (2×4) self-routing network 620 comprises a first optical splitter 701 for splitting each incoming cell on waveguide 611 into four identical optical outputs for coupling to optical gates 711–714, and a second optical splitter 701 for splitting each incoming cell on waveguide 612 into four identical optical outputs for coupling to optical gates 715–718, respectively. Optical gates 711–714 form pairs with optical gates 715–718, respectively, and the outputs of the paired gates are coupled to combiners 731–734 whose outputs are connected through waveguides 631–634 to the splitters 641–644. Electrical pulse generator 750 drives the paired gates with corresponding voltage pulses 801–804 through resistors 721–728 connected to gates 711–718, respectively. The control electrodes of these optical gates are coupled to respective voltage sensors 760 whose outputs connected to the controller 680.

The operation of the (2×4) self-routing network of FIG. 7 is as follows. Assume that the header of voltage pulses 801 and 802 occurs during the same timeslot $t_1$–$t_2$ which coincides with the position of the routing header bit of cells A ($\lambda 11$), B (($\lambda 22$) and C($\lambda 21$), and the header of voltage pulses 803 and 804 occurs during the same timeslot $t_2$–$t_3$ which coincides with the position of the routing header bit of optical cells D ($\lambda 12$), E ($\lambda 21$) and F ($\lambda 22$). Cells A, C and E are assumed to occur sequentially during first, second and third successive intervals, and cells B, D and F are assumed to occur during the same first, second and third intervals, respectively. It will be seen that cell A on waveguide 611 is switched through gate 711 and appears at waveguide 631 as its routing header bit coincides with the header of pulse 801, and cells B and C on respective waveguides 612, 611 are switched through gates 716, 712, respectively, and time multiplexed by combiner 732 onto waveguide 632 as their routing header bits coincide with the header of voltage pulses 802. Likewise, cell D on waveguide 612 is switched through gate 717 and appear at waveguide 633 as its routing header bit coincide with the header of pulse 803 and cells E and F on waveguides 611 and 612 are switched through gates 714, 718, respectively, and wavelength multiplexed by combiner 734 onto waveguide 634.

It is seen that only two timeslots are required for the optical header bits of this embodiment, a number which is ¼ of that which would otherwise be required for an equivalent optical (2×4) ATM switching system of input buffer type.

Figures 9, 9A:
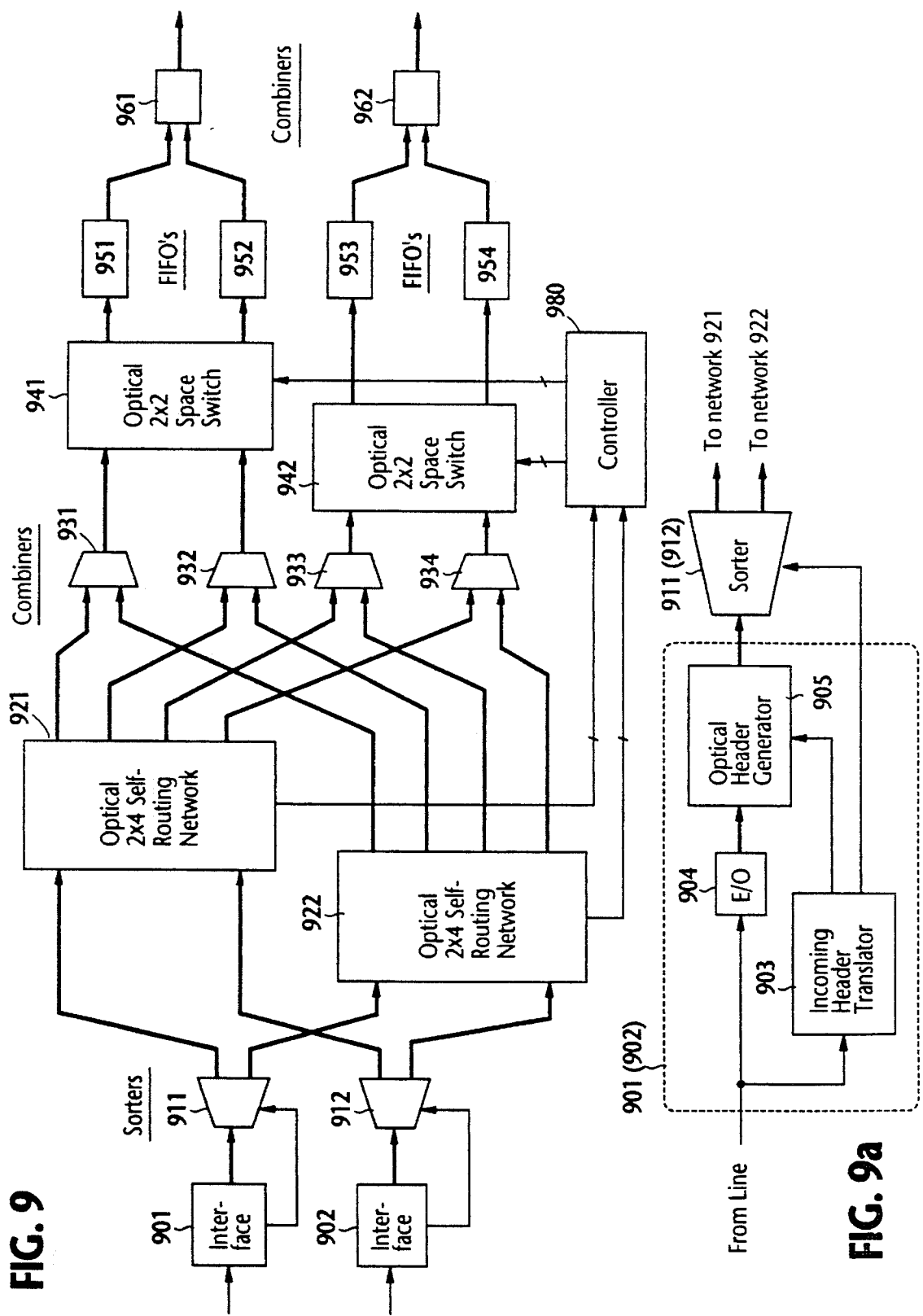
FIG. 9 is a block diagram of an optical (2×2) ATM switching system according to a fourth embodiment of the present invention.
FIG. 9a is a block diagram of a line interface unit of FIG. 9.

The throughput of optical ATM switching systems using optical routing headers can be increased by sorting incoming optical ATM cells between two or more self-routing networks. For this purpose, a fourth embodiment of the present invention is shown in FIG. 9. Incoming electrical ATM cells are entered to interface units 901 and 902, the outputs of which are respectively coupled to (1×2) sorters 911 and 912. Each of the sorters 911, 912 has two outputs respectively connected to respective inlets of optical (2×4) self-routing networks 921 and 922 of configuration identical to the network 620 of FIG. 7. In each interface unit, the cell header of each cell is examined by a header translator 903 (FIG. 9a) to generate a routing header position signal and a sorting signal, while the cell is converted to optical form by an E/O converter 904 and fed to an optical header generator 905. Header generator 90 responds to the routing header position signal by inserting an optical header bit in the same manner as described earlier. The output of optical header generator 905 is applied to an optical sorter 911 (912) to which the sorting signal from translator 903 is also applied for sorting the incoming cells to one of the self-routing networks.

Each of the self-routing networks 921, 922 has four outlets coupled to respective inputs of combiners 931–934. The outputs of combiners 931, 932 are connected to respective inputs of an optical (2×2) space switch 941 whose outputs are connected through buffer memories 951, 952 to combiner 961, and the outputs of combiners 933, 934 are connected to respective inputs of an optical (2×2) space switch 942 whose outputs are connected through buffer memories 953, 954 to combiner 962.

Controller 980 receives a routing signal from both self-routing networks to control the (2×2) space switches 941, 942 in a manner similar to that shown and described with reference to FIG. 1.

Figure 10:
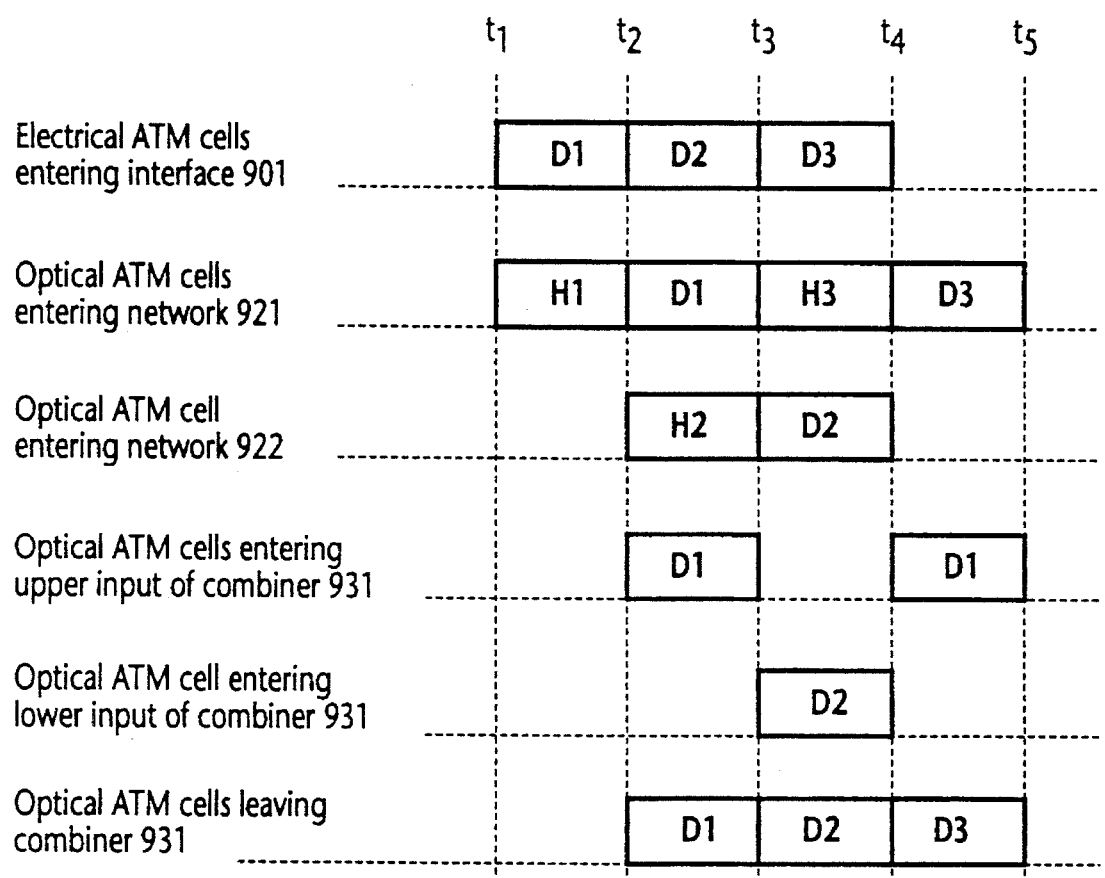
FIG. 10 is a timing diagram associated with FIG. 9.

The operation of the embodiment of FIG. 9 will be described with reference to FIG. 10. Assume that electrical ATM cells D1, D2, and D3 bound for the same destination successively arrive at interface unit 901 during intervals $t_1$–$t_2$, $t_2$–$t_3$ and $t_3$–$t_4$ and cells D1 and D3 are sorted to network 921 while cell D2 is sorted to network 922. During interval $t_1$–$t_2$, the header of electrical cell D1 is examined by translator 903 and an optical routing bit H1 is generated and appended to the optical version of cell D1 that occurs during interval $t_2$–$t_3$ and is sorted to network 921. Similarly, the header of electrical cell D2 is examined during interval $t_2$–$t_3$ and an optical routing bit H2 is generated and appended to the optical version of cell D3 that occurs during interval $t_3$–$t_4$ and is sorted to network 922. The header of electrical cell D3 is examined during the next interval $t_3$–$t_4$, and an optical routing bit H3 is generated and appended to the optical version of cell D3 that occurs during interval $t_4$–$t_5$ and is sorted to network 921. In each network, the cells are routed in a manner as described so that their routing header bits are consumed and the data bits of cells D1, D2, D3 are directed to the same combiner 931, for example, so that the cells separated by the sorter 911 are recombined at the output of combiner 931. By the sorting operation, the transfer of a header-appended cell to the appropriate network can be performed simultaneously with the appending of an optical routing bit to the next cell, and the cells can be processed by networks 921 and 922 in parallel fashion. Therefore, switched cells D1, D2 and D3 are closely spaced in time sequence at the output of combiner 931 between times $t_1$ and $t_5$ as illustrated in FIG. 10. Otherwise, incoming cells must be put in a queue to append a routing bit and as a result, it would require additional two slot intervals to complete the switching of cells D1, D2 and D3.

Figure 11:
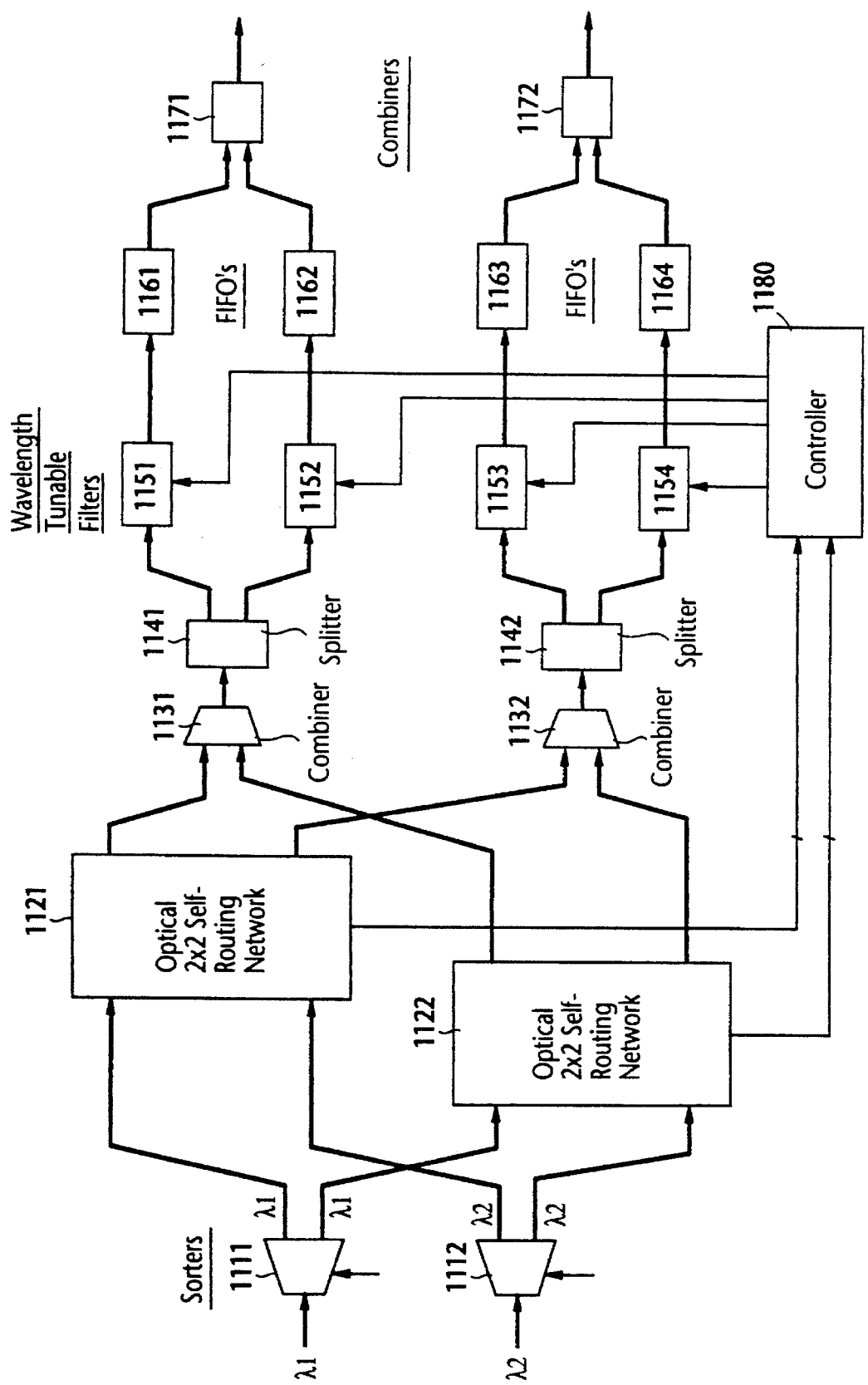
FIGS. 11 and 12 are block diagrams of alternative forms of the embodiment of FIG. 9.

An alternative form of the fourth embodiment of this invention is shown in FIG. 11 in which the sorting technique is combined with the wavelength division multiplexing of FIG. 4. Optical cells of wavelength $\lambda 1$ are input to 1×2 sorter 1111, and optical cells of wavelength $\lambda 2$ are input to 1×2 sorter 1112. The outputs of each sorter are coupled to respective inlets of (2×2) self-routing networks 1121 and 1122. Note that sorters 1111 and 1112 handle ATM cells of wavelengths respectively assigned to the sorters. The two outlets of each self-routing network are coupled to respective inputs of combiners 1131, 1132 whose outputs are input to splitters 1141, 1142, respectively. Wavelength tunable filters 1151–1154 are connected to respective outputs of splitters 1141, 1142 to selectively pass desired cells to buffer memories 1161–1164 under control of controller 1180 in response to a routing signal from networks 1121 and 1122. The outputs of buffer memories 1161–1164 are coupled in pairs to combiners 1171, 1172 as illustrated.

Figure 12:
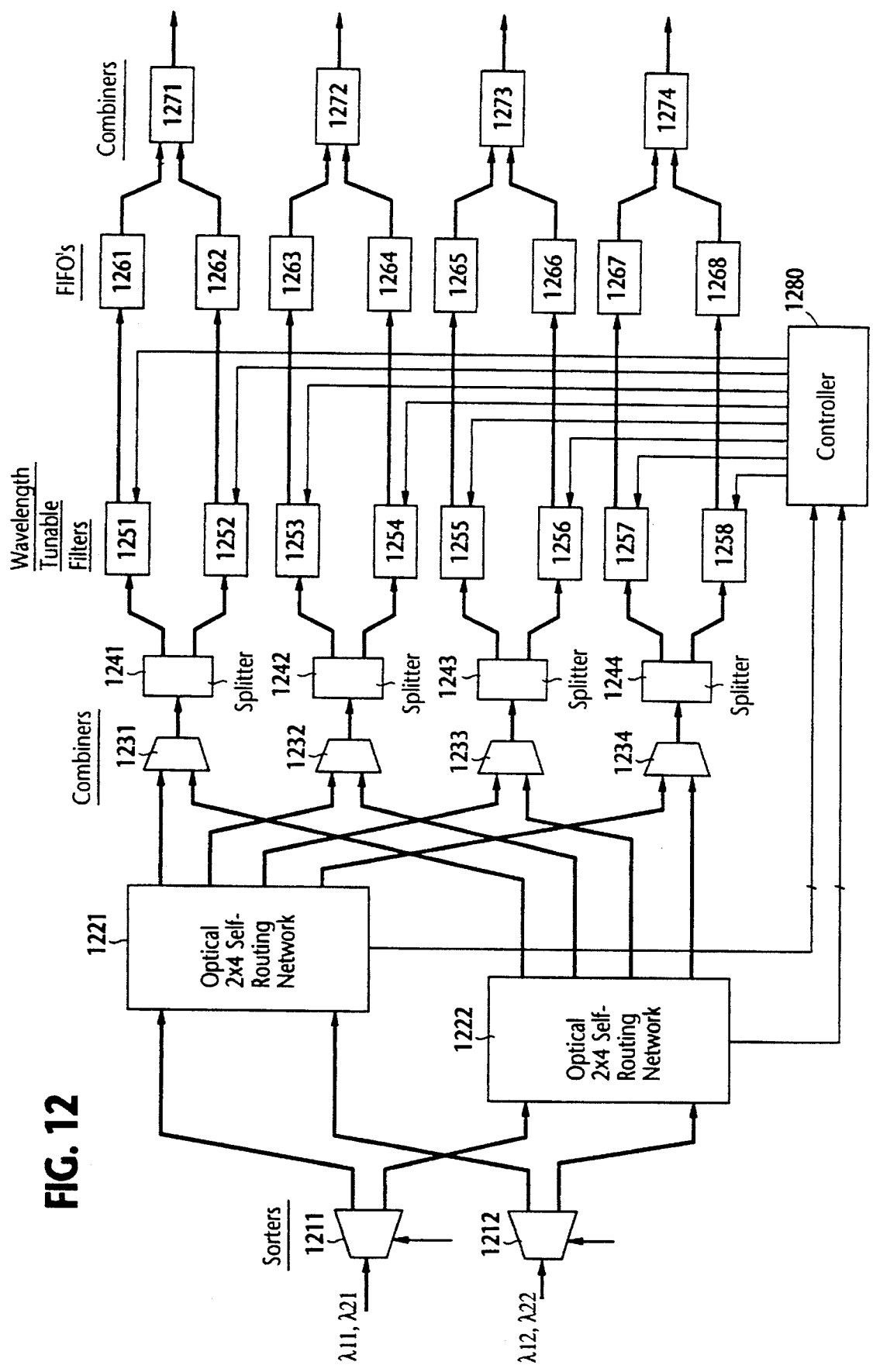

Another alternative form of the fourth embodiment of this invention is shown in FIG. 12 in which the sorting technique is combined with the wavelength multiplexing of FIG. 7. Optical cells of wavelengths λ11, λ21 are input to sorters 1211 and optical cells of wavelength λ12, λ22 are input to sorter 1212. The outputs of sorter 1211 are coupled to respective inlets of (2×4) self-routing networks 1221, 1222, the two outlets of each network being coupled to respective inputs of combiners 1231~1234 whose outputs are input to splitters 1241~1244, respectively. Wavelength tunable filters 1251~1258 are connected to respective outputs of splitters 1241~1244 to selectively pass desired cells to buffer memories 1261~1268 under control of controller 1280 in response to a routing signal from networks 1221 and 1222. The outputs of buffer memories 1261~1268 are connected in pairs to combiners 1271~1274.

Figure 13:
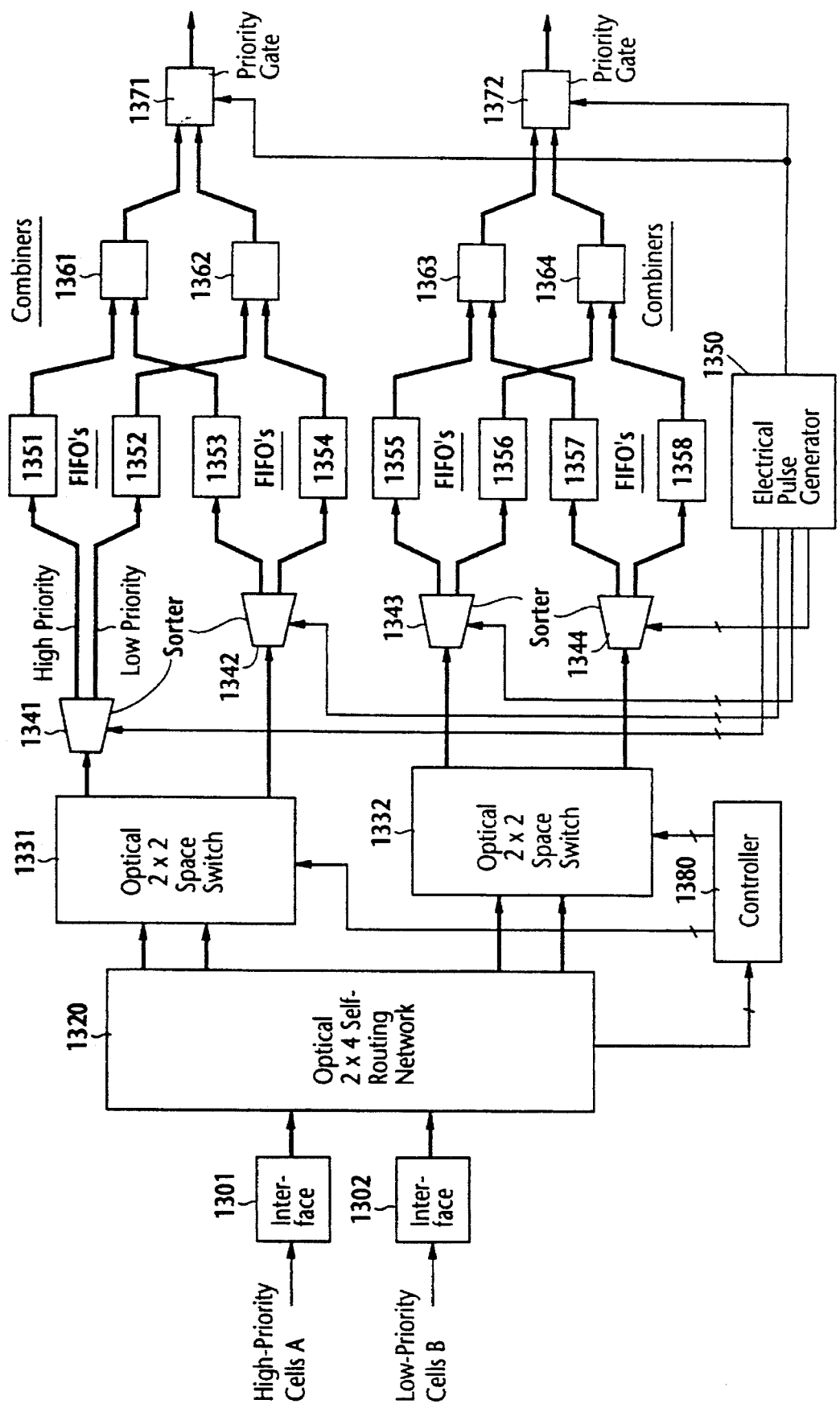
FIG. 13 is a block diagram of an optical (2×2) ATM switching system according to a fifth embodiment of the present invention.
Figure 14:
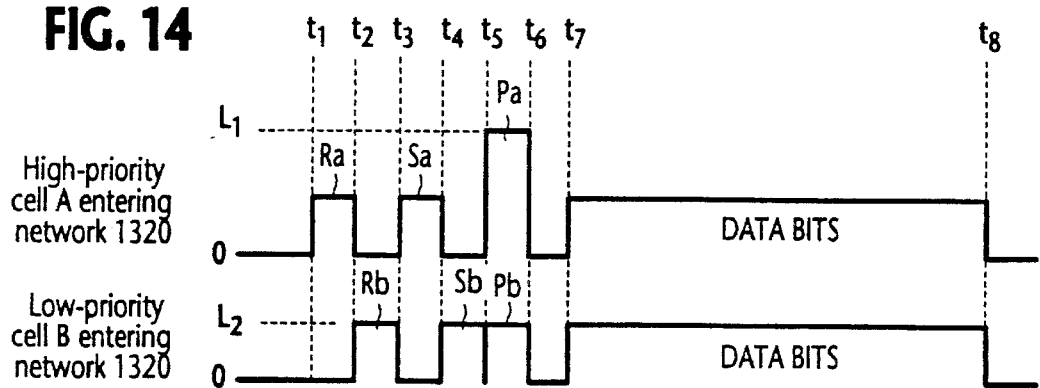
FIG. 14 is a timing diagram associated with FIG. 13.

A fifth embodiment of the present invention is shown in FIG. 13 in which the system receives ATM cells of different priorities and priority control is performed when output contention occurs between cells of different priorities. In FIG. 13, high-priority electrical ATM cells A are input to interface unit 1301 and low-priority electrical ATM cells B are input to interface unit 1302. Each of these interface units examine the destination identifiers contained in the received ATM cells and generate an optical routing bit in a manner as described, and further examine the priority bits to generate an optical sorting bit and an optical priority bit as shown in FIG. 14. In a typical example, to optical cell A the interface unit 1301 appends a routing bit Ra during timeslot $t_1$–$t_2$, a sorting bit Sa during timeslot $t_3$–$t_4$, and a high priority bit Pa during timeslot $t_5$–$t_6$, and to optical cell B the interface unit 1302 appends a routing bit Rb during timeslot $t_2$–$t_3$, a sorting bit Sb during timeslot $t_4$–$t_5$, and a low priority bit Pb during timeslot $t_5$–$t_6$. In each cell, data bits start at time $t_7$ and terminate at time $t_8$. Priority bit Pa has a higher light intensity $L_1$ than the light intensity $L_2$ of priority bit Pb. An optical (2×4) self-routing network 1320 is provided for receiving optical cells from the interface units 1301, 1302 for routing them using routing bits Ra and Rb to optical (2×2) space switches 1331 and 1332 where they are switched to one of their output terminals under control of controller 1380 in a manner identical to that described in connection with FIG. 1. The outputs of (2×2) space switch 1331 are connected to priority sorters 1341 and 1342, respectively. Each of these priority sorters has a high priority output terminal and a low priority output terminal and is controlled in response to voltage pulses supplied from an electrical pulse generator 1350 to set up an optical path to one of its output terminals according to the sorting bit of a cell it receives from the associated space switch in a manner as described in detail below.

FIFO buffer memories 1351~1358 are provided. These buffer memories are grouped into four pairs respectively corresponding to sorters 1341~1344 and the memories of each pair are connected to the outputs of the corresponding sorters. Therefore, the buffer memories connected to the high priority output terminals of the sorters receive only high priority cells A and those connected to the low priority output terminals receive only low priority cells B. The outputs of high priority memories 1351 and 1353 are connected to the inputs of a combiner 1361 and the outputs of low priority memories 1352 and 1354 are connected to the inputs of a combiner 1362, the output of these combiners being connected to a respective input of a priority gate 1371.

In a similar manner, the outputs of high priority memories 1355 and 1357 are connected to the inputs of a combiner 1363 and the outputs of low priority memories 1356 and 1358 are connected to the inputs of a combiner 1364, the output of these combiners being connected to a respective input of a priority gate 1372. Each of the priority gates 1371 and 1372 receives a voltage pulse from the pulse generator 1350 to pass high priority cells to the output of the gate when contention occurs with a low priority cell at the inputs of the gate in a manner as will be described later.

Figure 15:
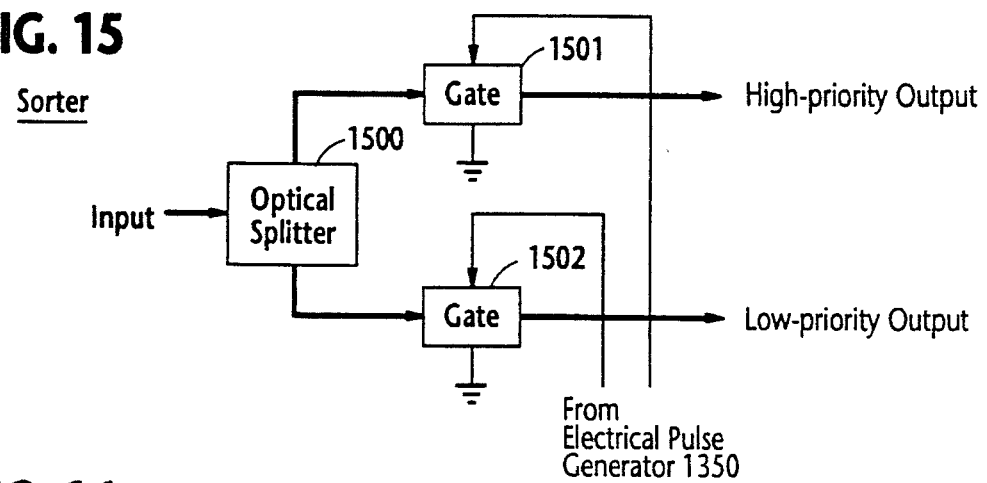
FIG. 15 is a block diagram of a sorter of FIG. 13.
Figure 16:
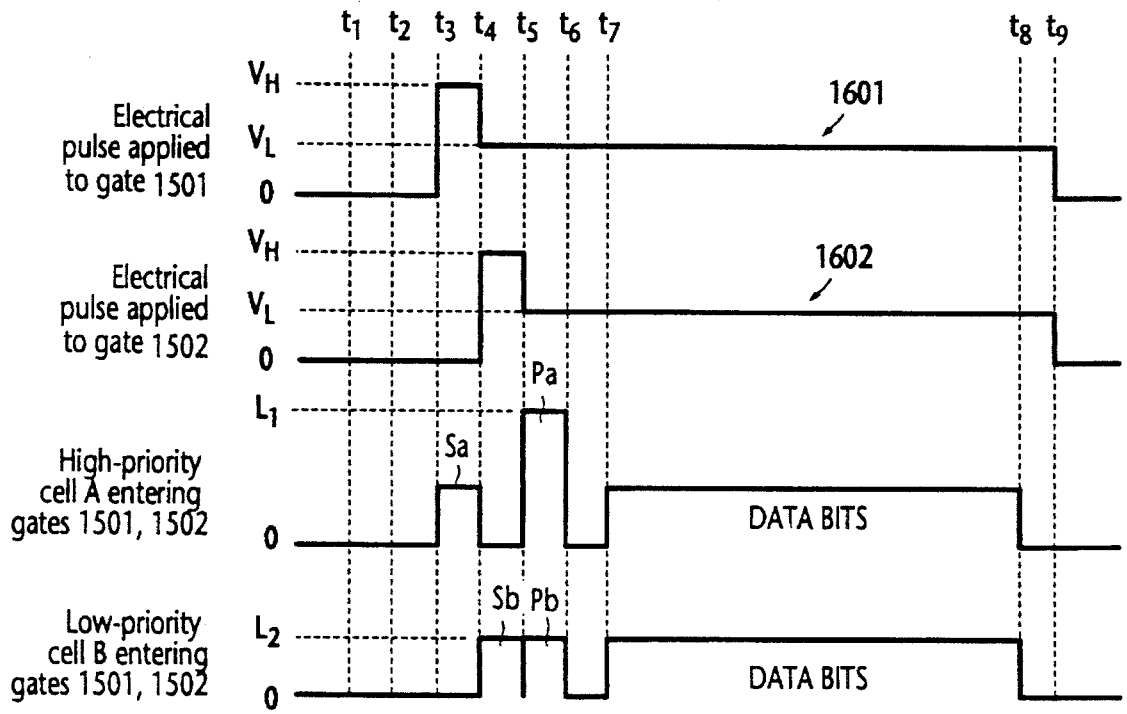
FIG. 16 is a timing diagram associated with the sorter of FIG. 15.

As shown in detail in FIG. 15, each of the priority sorters comprises an optical splitter 1500 having two outputs, and a pair of optical gates 1501 and 1502 connected respectively to the outputs of splitter 1500. Each optical gate is driven by a different voltage pulse supplied from the pulse generator 1350. As shown in FIG. 16, a voltage pulse 1601 having a header during interval $t_3$–$t_4$ and a pedestal portion terminating at time $t_9$ is applied to gate 1501 and a voltage pulse 1602 having a header during interval $t_4$–$t_5$ and a pedestal terminating at time $t_9$ is applied to gate 1502. Since the high-priority cell A has consumed its routing bit Ra as the cell is switched by the self-routing network 1320, it contains the sorting bit Sa and priority bit Pa. The sorting bit Sa of the signal applied to gate 1501 coincides with the header of voltage pulse 1601, and so its data bits are allowed to pass through gate 1501 to the high-priority output of the sorter, while the data bits of the other input to gate 1502 are rejected. Likewise, the low-priority cell B has consumed its routing bit Rb as it is switched by the self-routing network 1320, it contains the sorting bit Sb and priority bit Pb. When either of cells A and B is applied to the sorter, it is divided into identical signals by splitter 1500 and applied to gates 1501 and 1502, respectively. Since the sorting bit Sa of cell A applied to gate 1501 coincides with the header of voltage pulse 1601, the data bits thereof are allowed to pass through gate 1501 to the high-priority output of the sorter, while the data bits of cell A applied to gate 1502 are not allowed to pass through it. On the other hand, the sorting bit Sb of cell B applied to gate 1502 coincides with the header of voltage pulse 1602, the data bits thereof are allowed to pass through gate 1502 to the low-priority output of the sorter, while the data bits of cell B applied to gate 1501 are not allowed to pass through it. In this way, cells of different priority levels are sorted according to the timeslot position of their sorting bits in relation to the timeslot position of the applied voltage pulse.

Details of the priority gates 2081, 2082 are shown in FIG. 17. Each priority gate comprises a pair of optical gates 1701 and 1702 for receiving a high-priority cells and a low-priority cell from the associated combiners, respectively. Pulse generator 1450 supplies a voltage pulse 1801 through a resistor 1703 to the control electrodes of these gates (FIG. 18). The outputs of gates 1701 and 1702 are combined by a combiner 1704.

As shown in FIG. 18, the header of this voltage pulse has amplitude $V_{H0}$ and occurs during interval $t_5$–$t_6$ coincident with both priority bits Pa and Pb, and the pedestal portion of this pulse has amplitude $V_{L0}$ and terminates at time $t_9$. If contention occurs at the inputs of the priority gate between a high priority cell A and a low priority cell B, the cell A has only the priority bit Pa as it has consumed its sorting bit Sa in the previous stage, and the low-priority cell B has likewise the priority bit Pb only. Since priority bit Pa has a higher intensity than priority bit Pb, gate 1701 is triggered into transmissive state, causing a current to flow through the conducting gate, and hence a voltage drop across resistor 1703. Thereafter, the header of the voltage pulse applied to both optical gates 1701, 1702 reduces to level $V_{H1}$ and the pedestal to $V_{L1}$ as indicated at 1802 which is sufficient to maintain its transmissivity to pass the data portion of cell A through gate 1701 to be delivered through combiner 1704 to the output terminal.

An alternative form of the priority gating operation is shown in FIG. 19. The high priority cell A is appended with a priority bit P'a that occurs during interval $t_5$–$t_6$, and the low priority cell B is appended with a priority bit P'b that occurs during interval $t_6$–$t_7$, with both priority bits being of equal light intensity. The data bits of each cell exist during interval $t_5$–$t_9$. The pulse generator 1450 supplies a voltage pulse 1901 to resistor 1703 with a header with amplitude $V_{H0}$ that lasts between times $t_6$ and $t_7$ and a pedestal portion with amplitude $V_{L0}$ that terminates at time $t_{10}$. Since priority pulse P'a is earlier than P'b when contention occurs between cells A and B at the priority gate, optical gate 1701 is triggered, causing a current to flow through resistor 1703, so that the header of the voltage pulse applied to both gates reduces to level $V_{H1}$ and the pedestal portion of the pulse to level $V_{L1}$. as indicated by a pulse 1902.

Figure 20:
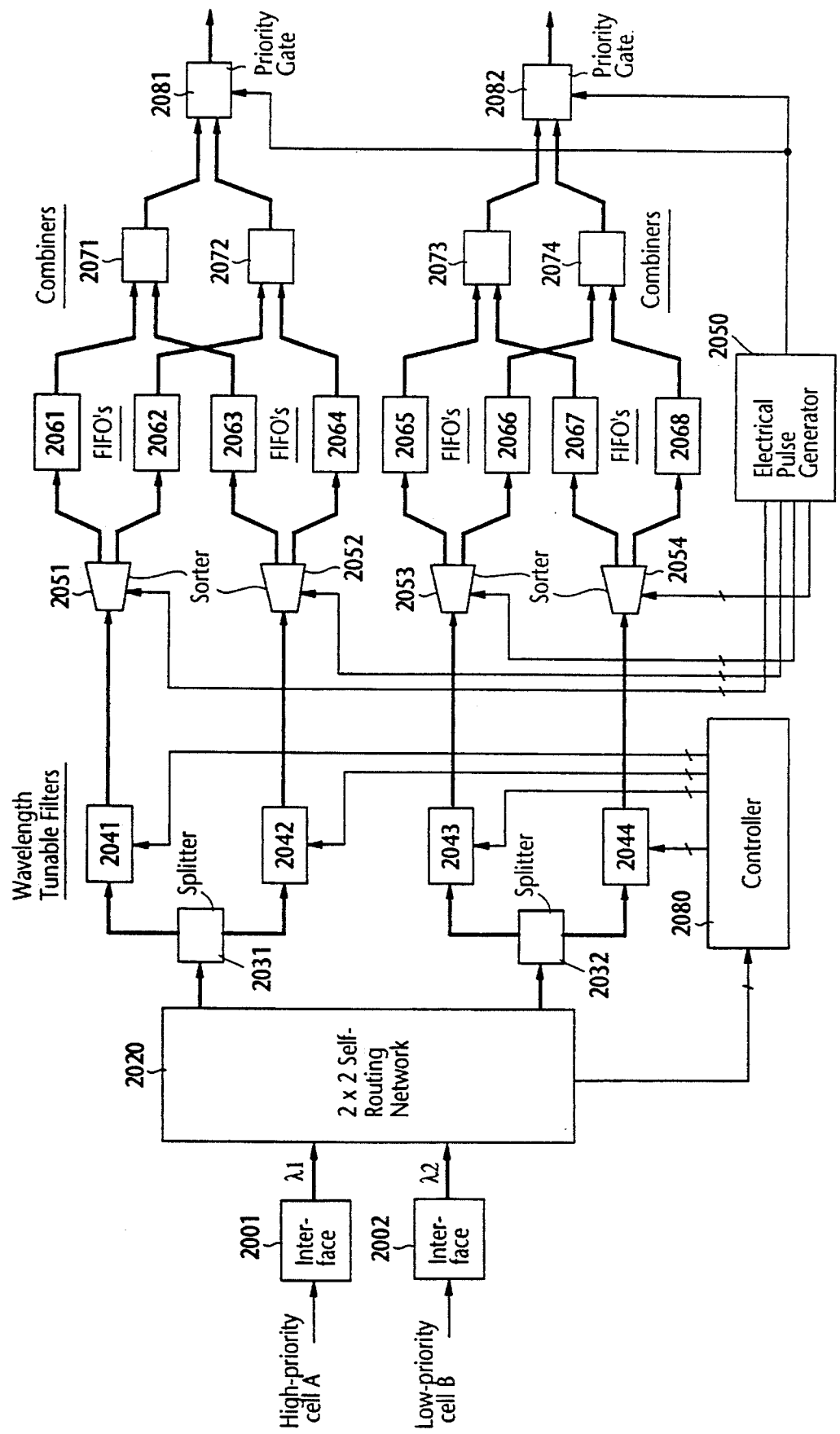
FIGS. 20 and 21 are block diagrams of alternative forms of the sixth embodiment.

An alternative form of the fifth embodiment of this invention is shown in FIG. 20 in which priority selection is combined with the wavelength division multiplexing of FIG. 4. Electrical high-priority cells A are input to interface 2001 where they are converted to optical signal of wavelength λ1 and applied to (2×2) self-routing network 2020 and electrical low-priority cells B are input to interface 2002 where they are converted to optical signals of wavelength λ2 and applied to the network. Each outlet of network 2020 is connected to a splitter 2031 (2032) having two outputs respectively connected to wavelength tunable filters 2041, 2042 (2043, 2044), the outputs of filters 2041, 2042 (2043, 2044) being connected to sorters 2051, 2052 (2053, 2054), respectively. Sorters 2051~2054 are responsive to voltage pulses supplied from electrical pulse generator 2050 to sort the high priority cells to FIFO buffer memories 2061, 2063, 2065, 2067 whose outputs are connected to combiners 2071, 2073 and the low priority cells to memories 2062, 2064, 2066, 2068 whose outputs are connected to combiners 2072 and 2074. Priority gate 2081 is connected to the outputs of combiners 2071, 2072 and priority gate 2082 to the outputs of combiners 2073, 2074 to provide priority selection when contention occurs.

Figure 21:
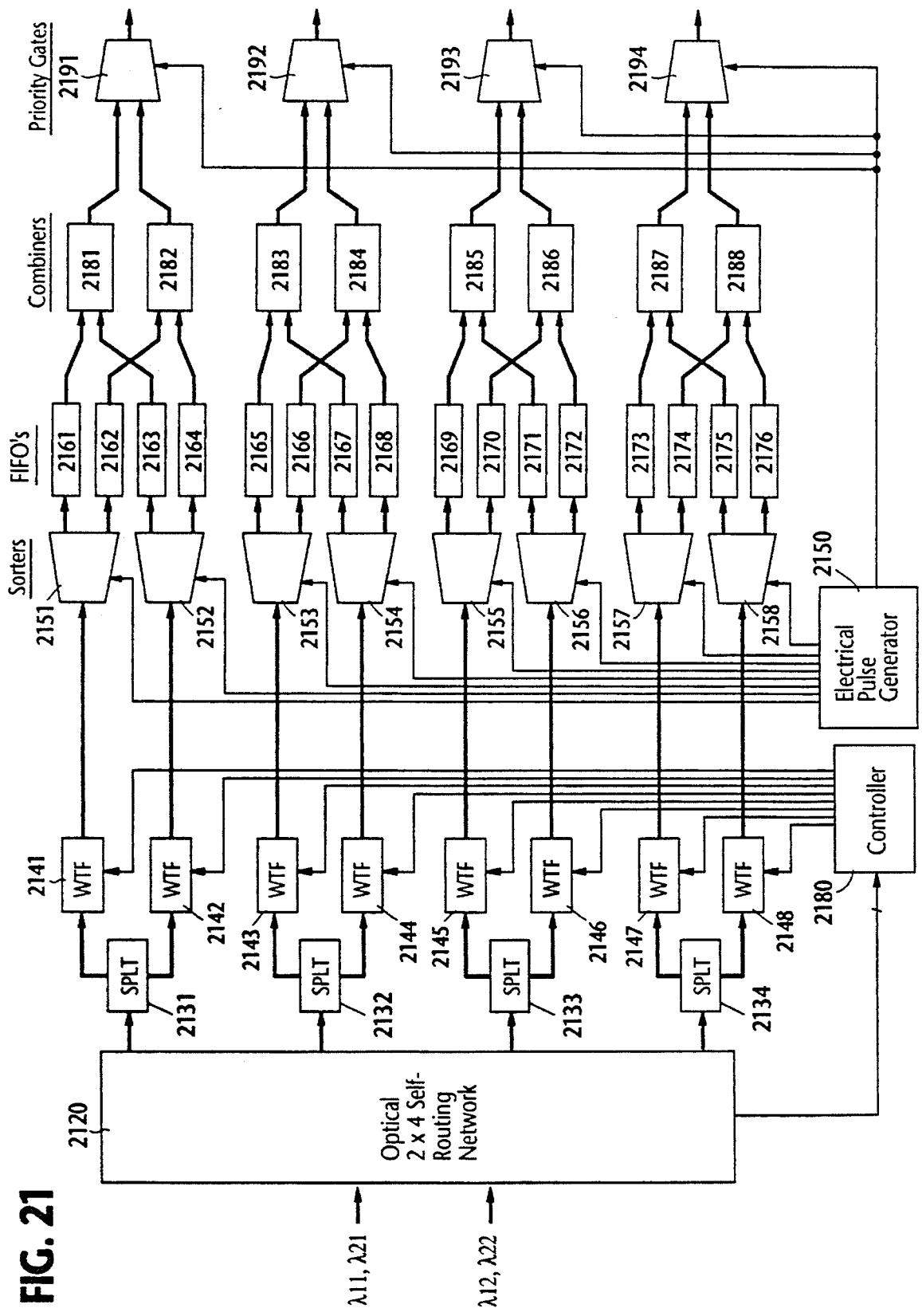

In another alternative form, the priority selection feature of the fifth embodiment can be combined with the wavelength multiplexing of FIG. 7 as shown in FIG. 21. Optical cells of different priorities with wavelength λ11, λ21 are input to one inlet of (2×4) self-routing network 2120 and optical cells of different priorities with wavelength λ12, λ22 are input to the other inlet of the network. Each outlet of the (2×4) network 2120 is connected to a splitter 2131 (2132–2134) having two outputs respectively connected to wavelength tunable filters 2141, 2142 (2143–2148), the outputs of filters 2141, 2142 (2143, 2144) being connected to sorters 2151, 2152 (2153–2158), respectively. Sorters 2151–2158 are responsive to voltage pulses supplied from electrical pulse generator 2150 to sort the high priority cells to FIFO buffer memories 2161, 2163, 2165, 2167, 2169, 2171, 2173, 2175 whose outputs are connected to combiners 2181, 2183, 2185, 2187 and sorts the low priority cells to memories 2162, 2164, 2166, 2168, 2170, 2172, 2174, 2176 whose outputs are connected to combiners 2182, 2184, 2186, 2188. Priority gate 2191 (2192, 2193, 2194)is connected to the outputs of combiners 2181, 2182 (2183–2188) to provide priority selection when contention occurs.

Figure 22:
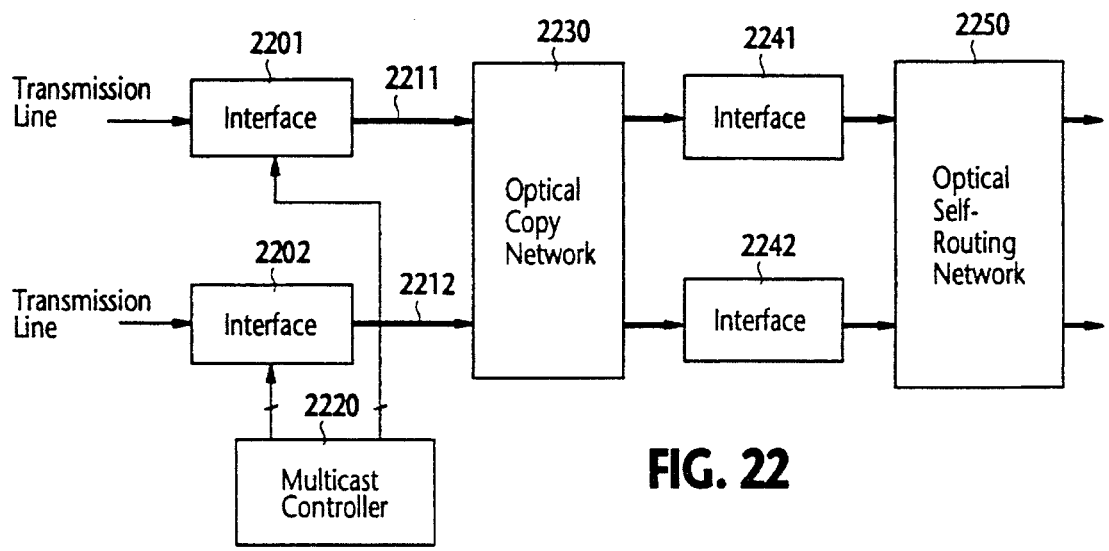
FIG. 22 is a block diagram of a sixth embodiment of the present invention in which an optical copy network is used in conjunction with an optical self-routing network.
Figure 23A:
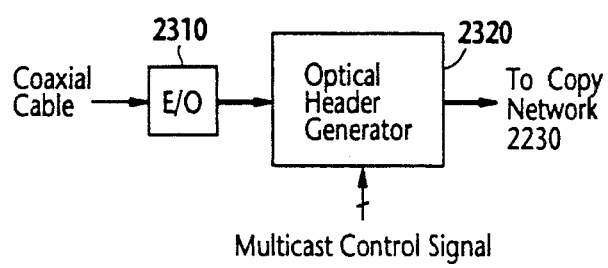
FIGS. 23a and 23b are block diagrams of a line interface unit of FIG. 22.
Figure 23B:
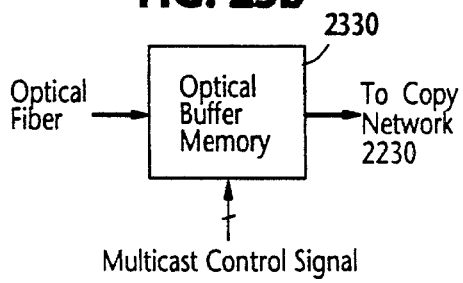

A sixth embodiment of the present invention is shown in FIG. 22. In this embodiment, an optical (2×2) copy network 2230 is provided in a preceding stage of the optical self-routing network of the present invention for multicasting an ATM cell to as many outlets of the self-routing network as there are routing (copying) bits contained in the optical header of the cell. As illustrated in FIG. 22, the system includes interface units 2201 and 2202 through which electrical ATM cells from the associated transmission lines are received and converted to optical form for coupling through waveguides 2211 and 2212 to the copy network. The interface units are connected to a multicast controller 2220 which generates a multicast control signal indicating the number of "copying" bits to be inserted to the optical header of ATM cells as well as the timeslot positions of the copying bits in the optical header. As illustrated in FIG. 23a, each interface unit is comprised of an electrooptical converter 2310 connected to a coaxial cable through which it receives incoming signals and converts them into optical signals. An optical header generator 2320 is coupled to the E/O converter. In response to a multicast control signal from multicast controller 2220, the interface unit inserts optical copying bits in the indicated timeslots of the header of an optical ATM cell and forwards it to the copy network 2230. If the transmission medium is optical fiber, an optical buffer memory 2330 is used (see FIG. 23b). Such optical buffer memories are described in a paper titled "Photonic ATM Switch Using Vertical To Surface Transmission Electro-Photonic Devices (VSTEPs), Makoto Nishio et al., The XIV International Switching Symposium, Proceedings Vol. 2, Oct. 25–30, 1992, Yokohama, Japan.

Figure 24:
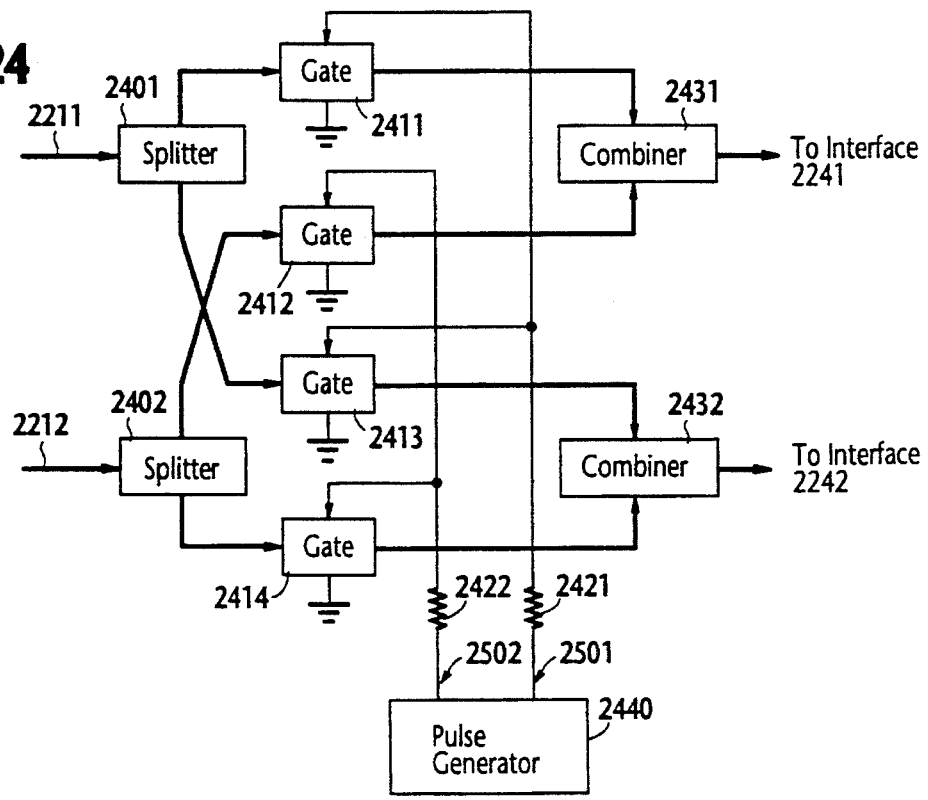
FIG. 24 is a block diagram of the copy network of FIG. 22.

The outputs of copy network 2230 are coupled respectively to interface units 2241 and 2242 whose outputs are connected to an optical self-routing network 2250 constructed according to the present invention. As illustrated in FIG. 24, the (2×2) optical copy network 2230 comprises (1×2) splitters 2401 and 2402 connected to the waveguides 2211 and 2212, respectively. The outputs of splitter 2401 are connected to optical gates 2411 and 2413, respectively, and the outputs of splitter 2402 are connected to optical gates 2412 and 2414, respectively. A pulse generator 2440 supplies a first voltage pulse through resistor 2421 to the control electrodes of optical gates 2411 and 2413 and a second voltage pulse through resistor 2422 to the control electrodes of optical gates 2412 and 2414. The outputs of optical gates 2411 and 2412 (2413 and 2414) are connected to a combiner 2431 (2432) whose output is coupled to an interface 2241 (2242).

Figure 25:
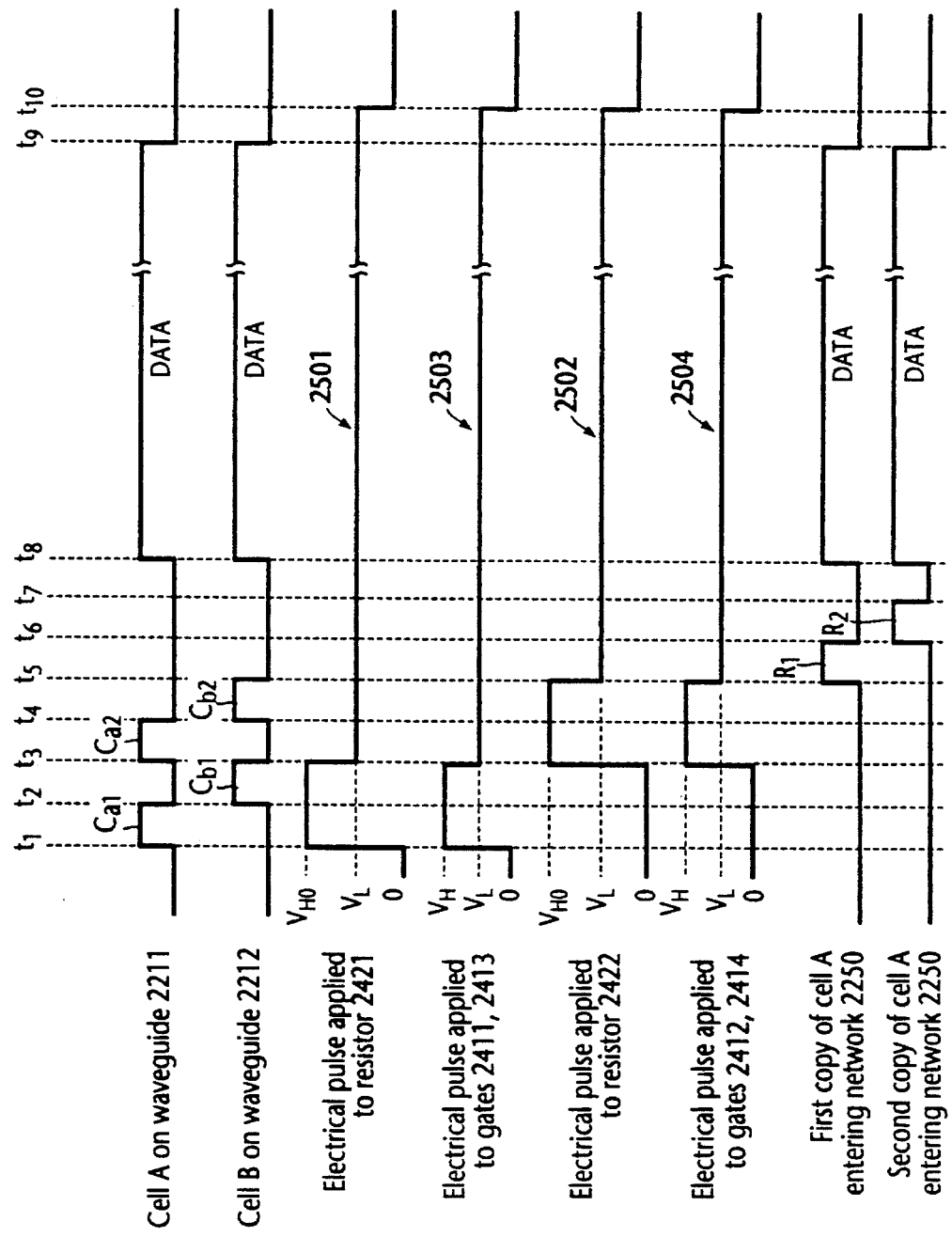
FIG. 25 is a timing diagram associated with FIG. 24.

A typical example of the voltage pulses and optical cells appearing in FIG. 24 is shown in FIG. 25. The optical header of each cell is divided into several timeslots and copying bits $C_{a1}$ and $C_{a2}$ are inserted into timeslots $t_1$–$t_2$ and $t_3$–$t_4$ of cell A on waveguide 2211, and copying bits $C_{b1}$ and $C_{b2}$ are inserted into timeslots $t_2$–$t_3$ and $t_4$–$t_5$ of cell B on waveguide 2212. The header of the first voltage pulse 2501 applied to resistor 2421 from pulse generator 2440 occupies two consecutive timeslots $t_1$–$t_3$ and the header of the second voltage pulse 2502 applied to resistor 2422 occupies two consecutive timeslots $t_3$–$t_5$. If optical cell A is incident on the input of splitter 2401 during a given ATM frame interval, the copying bits $C_{a1}$ and $C_{a2}$ coincide with the respective headers of voltage pulses 2501 and 2502 applied to resistors 2421, 2422. Optical gates 2411 and 2413 are driven into light transmissive state to allow cell A to be passed to combiners 2431 and 2432, so that copies of cell A are forwarded to interface units 2241 and 2242, respectively, while drawing currents through resistors 2421 and 2422. As a result, the header of both voltage pulses reduce to a level too low for the other optical gates to turn on. With optical gates 2411, 2413 being rendered conductive, the voltage pulss applied to optical gates 2411, 2413 appears as shown at 2503 and the voltage pulse applied to gates 2412, 2414 appears as shown at 2504.

If cells A and B are simultaneously entered to splitters 2401 and 2402, contentions occur between copies of these cells at the inputs of optical gates 2411 and 2412 and at the inputs of optical gates 2413 and 2414. Since the copying bits of cell A are earlier than those of cell B, only copies cell A are allowed to pass through optical gates 2411 and 2413 and directed to interface units 2241 and 2242.

If the interface units 2241 and 2242 are identical to those shown and described in connection with the embodiment of FIG. 1, they insert routing bits $R_1$ and $R_2$ into different timeslots $t_5$–$t_7$, for example, of the first and second copies of the incoming cell as illustrated in FIG. 25. The copies of the cells are now launched into the self-routing network 2250 and routed according to their routing bits in a manner as described in the previous embodiments.

What is claimed is:

1. An optical ATM (asynchronous transfer mode) switching system comprising:

multicasting control means for generating a multicast control signal indicating destinations of copies of an optical ATM cell;

a plurality of interface means for inserting a plurality of optical copying bits into an optical ATM cell in response to said multicast control signal; and an optical copy network having a plurality of inlets connected respectively to said plurality of interface means for producing copies of an ATM cell from each of said plurality of interface means and routing said copies to a plurality of outlets of the copy network according to said copying bits;

wherein said copy network comprises:

means for generating electrical signals of different timing;

a plurality of optical splitters connected respectively to said plurality of interface means;

a plurality of optical gates connected to outputs of different ones of said optical splitters of the copy network for allowing passage of an incident optical ATM cell when the copying bits of the cell timely coincide with one of said electrical signals; and a plurality of optical combiners, each corresponding to a group of said optical gates of the copy network for combining ATM cells from the optical gates of the corresponding group and coupling the combined ATM cells to one of the oulets of the copy network.

2. An optical ATM switching system as claimed in claim 1, wherein each of said electrical signal has a higher amplitude header portion and a lower amplitude trailer portion.

* * * * *

UNITED STATES PATENT AND TRADEMARK OFFICE
CERTIFICATE OF CORRECTION

PATENT NO. : 5,506,714
DATED : April 9, 1996
INVENTOR(S) : Makoto NISHIO

It is certified that error appears in the above-indentified patent and that said Letters Patent is hereby corrected as shown below:

Column 7, line 26, delete "B((λ22)" and insert --B(λ22)--.

Signed and Sealed this

Twenty-fourth Day of September, 1996

Attest:

BRUCE LEHMAN

Attesting Officer    Commissioner of Patents and Trademarks